SHAFT POSITION CONVERTER DEVICE

Filed July 26, 1949

Inventor
DARRIN H. GRIDLEY

By M. O. Hayes

ATTORNEY

Sept. 20, 1960 D. H. GRIDLEY 2,953,777

SHAFT POSITION CONVERTER DEVICE

Filed July 26, 1949 13 Sheets-Sheet 2

Inventor
DARRIN H. GRIDLEY

By M. O. Hayes

ATTORNEY

SHAFT POSITION CONVERTER DEVICE

Filed July 26, 1949 13 Sheets-Sheet 3

Inventor
DARRIN H. GRIDLEY
By M. C. Hayes
ATTORNEY

Sept. 20, 1960 D. H. GRIDLEY 2,953,777

SHAFT POSITION CONVERTER DEVICE

Filed July 26, 1949 13 Sheets-Sheet 4

Inventor
DARRIN H. GRIDLEY

By M. Q. Hayes

ATTORNEY

Sept. 20, 1960 D. H. GRIDLEY 2,953,777

SHAFT POSITION CONVERTER DEVICE

Filed July 26, 1949 13 Sheets-Sheet 5

Inventor
DARRIN H. GRIDLEY

By M. O. Hayes

ATTORNEY

Sept. 20, 1960 D. H. GRIDLEY 2,953,777

SHAFT POSITION CONVERTER DEVICE

Filed July 26, 1949 13 Sheets-Sheet 6

Inventor
DARRIN H. GRIDLEY

By M. O. Hayes

ATTORNEY

Sept. 20, 1960 D. H. GRIDLEY 2,953,777

SHAFT POSITION CONVERTER DEVICE

Filed July 26, 1949 13 Sheets-Sheet 7

Inventor
DARRIN H. GRIDLEY

By M. O. Hayes

ATTORNEY

Sept. 20, 1960 D. H. GRIDLEY 2,953,777

SHAFT POSITION CONVERTER DEVICE

Filed July 26, 1949 13 Sheets-Sheet 8

Inventor
DARRIN H. GRIDLEY

By M. A. Hayes

ATTORNEY

Sept. 20, 1960 D. H. GRIDLEY 2,953,777

SHAFT POSITION CONVERTER DEVICE

Filed July 26, 1949 13 Sheets-Sheet 9

Inventor
DARRIN H. GRIDLEY

By M. O. Hayes

ATTORNEY

Sept. 20, 1960 D. H. GRIDLEY 2,953,777

SHAFT POSITION CONVERTER DEVICE

Filed July 26, 1949 13 Sheets-Sheet 10

Inventor
DARRIN H. GRIDLEY
By
M. A. Hayes
ATTORNEY

Sept. 20, 1960 D. H. GRIDLEY 2,953,777

SHAFT POSITION CONVERTER DEVICE

Filed July 26, 1949 13 Sheets-Sheet 11

Inventor
DARRIN H. GRIDLEY

By M. D. Hayes

ATTORNEY

Inventor
DARRIN H. GRIDLEY

By M. C. Hayes

ATTORNEY

Inventor
DARRIN H. GRIDLEY

By M. O. Hayes

ATTORNEY

United States Patent Office 2,953,777

Patented Sept. 20, 1960

2,953,777

SHAFT POSITION CONVERTER DEVICE

Darrin H. Gridley, % Naval Research Laboratory, Anacostia Station, Washington 25, D.C.

Filed July 26, 1949, Ser. No. 106,949

12 Claims. (Cl. 340—347)

(Granted under Title 35, U.S. Code (1952), sec. 266)

This invention relates to multiplex apparatus for deriving, recording and reproducing in accurate digital form information relative to the positions of each of a plurality of movable members. In particular it relates to multiplex apparatus for providing a digital representation of the angular positions of remote shafts and for recording and reproducing that information in an accurate manner.

In numerous instances it is necessary to operate equipment in which information is obtained as variations in the angular position of a plurality of shafts. A typical instance of a situation which would involve such multiple shaft indication is a gunfire control system wherein various quantities such as range, elevation, roll, pitch, etc. are customarily derived as shaft rotations. In testing equipment also, information relative to a plurality of variables is frequently presented by meters such as galvanometers in which the position of each of several individual rotatable shafts is varied in dependency on a variable quantity.

Where such a plurality of indicators is employed it is generally necessary to provide some means of recording the variable information in a form that is readily usable by automatic calculating equipment. Simple recording galvanometers have been used quite extensively in the past, however the information which is contained in a record produced thereby is not in a form which is readily available for insertion in automatic calculating equipment. The information must be read, tabulated, and inserted as definite numbers, all by manual operations. Other recording methods have been employed, such as simultaneous photography of the indicators at selected intervals, but again the human element in reading, tabulating and inserting is involved. This manual work can become quite prodigious particularly when a typical application might involve as many as eight variables each of which is sampled or photographed at a typical rate of ten times per second.

In many applications involving electrical information, storage and calculating equipment the information is generally conveyed as numbers but the decimal system as normally used is not readily handled by electrical apparatus such as relays, electronic counters and the like. Each decimal digit requires ten conditions to represent it whereas a simple relay can usually be either open or closed with no reliable in-between position. So that such two position apparatus can be simply employed it is possible to make use of a completely different system of numbers known generally as the binary digit system in which only two conditions are required to represent each digit of the number.

For illustration the decimal numerals 0 to 9 can be represented in binary code as follows:

| Decimal Numeral | Binary System |
|---|---|
| 0 | O C O C |
| 1 | C O O O |
| 2 | O C O O |
| 3 | C C O O |
| 4 | O O C O |
| 5 | C O C O |
| 6 | O C C O |
| 7 | C C C O |
| 8 | O O O C |
| 9 | C O O C |

As will be recognized from the above table the decimal numerals between 0 and 9 can be represented by a four place binary number with each digit having either of two values respectively characterized by the letters "O" or "C." Broadly, the number of decimal numerals which can be indicated in binary form varies as 2 to the N power where N is equal to the number of places in the binary number. Using a four place binary number as illustrated above a total of 16 decimal numerals can be indicated although only 10 have been shown.

Therefore and since each digit of the binary numeral has only two values, or conditions, typified by the letters "O" and "C" above, such digits can readily be handled and indicated by two positional electrical apparatus such as relays and scale-of-two counter circuits.

Also the "O" and "C" letters tabulated may indicate the two conditions in the photographic system for example, they may represent "opaque" or "clear" portions of a light filter.

It is therefore a primary object of the present invention to provide an accurate method for deriving information relative to the position of a plurality of variable quantities, for recording that information, and for reproducing that information for evaluation such as by direct insertion in automatic calculating equipment.

It is another object of the present invention to provide a method for deriving coded representations of the instantaneous position of a movable member.

Another object of the present invention is to provide a method for sequentially recording accurately coded representation relative to the position of a plurality of variable members.

Another object of the present invention is to provide a method of converting recorded coded representations regarding position of a plurality of variable members into a form usable by automatic calculating equipment.

Another object of the present invention is to provide equipment which will derive binary digital coding relative to the angular positions of independent rotatable shafts with an accuracy of one part in the fifth angular decimal digit, which can further sequentially record the binary digital coding for all shafts in a single channel and which will convert the recorded information into a form usable by automatic calculating equipment.

Another object of the present invention is to provide apparatus which will derive binary digital representation of the angular position of movable shafts.

Another object of the present invention is to provide apparatus for sequentially recording in a minimum number of channels binary digital representation of the individual position of each of a plurality of variable shafts.

Another object of the present invention is to provide apparatus for reproducing recorded binary digital representations of shaft position in such manner that the information recorded may be delivered to automatic calculating equipment without manual intervention.

Other and further objects and features of the present invention will become apparent upon a careful consideration of the accompanying description and drawings.

Figure 4A:
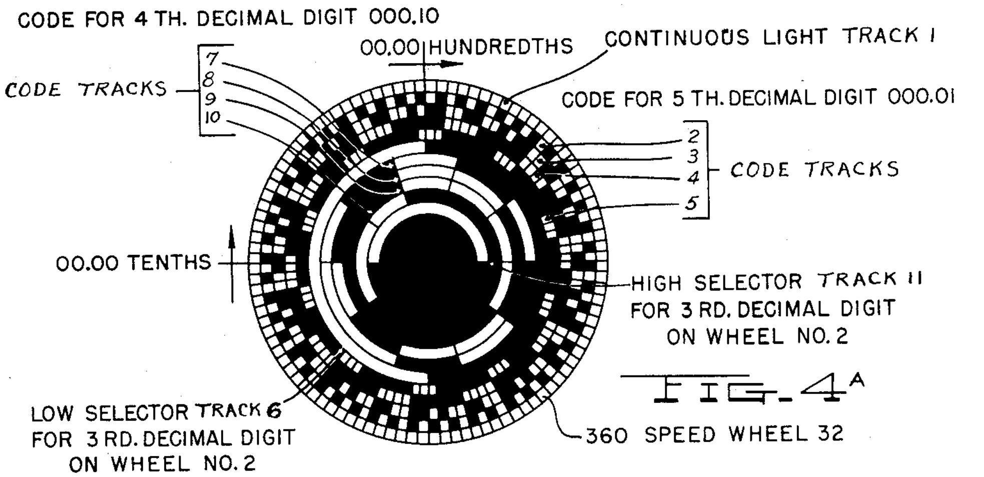
Figure 4B:
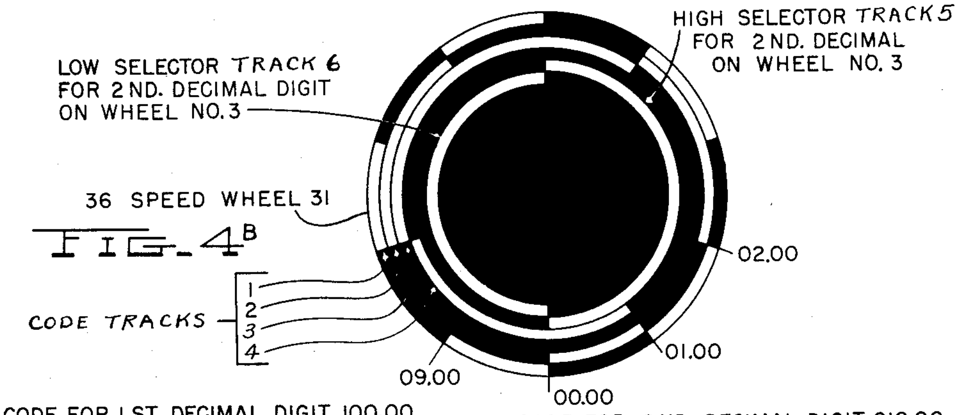
Figure 4C:
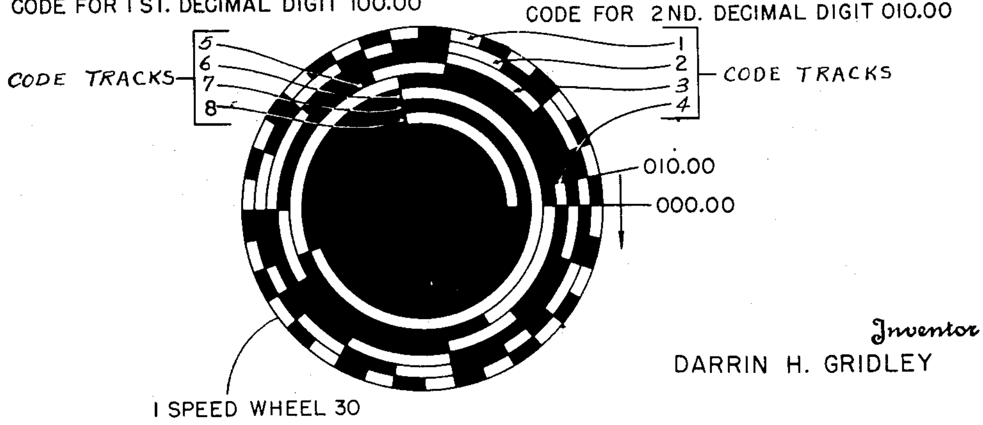

Figs. 4–A, 4–B and 4–C show various code wheels employed to photoelectrically derive digital representation of shaft position.

Figures 5, 10:
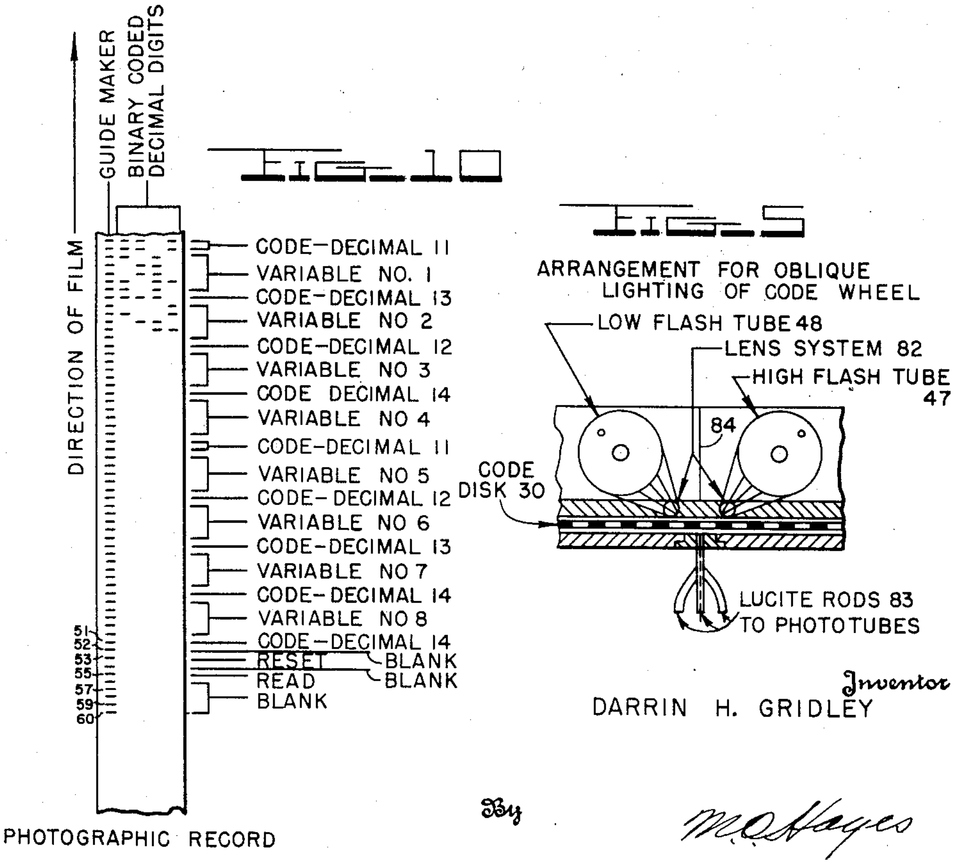

Fig. 5 shows a method of oblique lighting of the code wheels of Figs. 4–A, 4–B and 4–C to obtain reduced error in deriving digital representation of shaft position.

Figure 6:
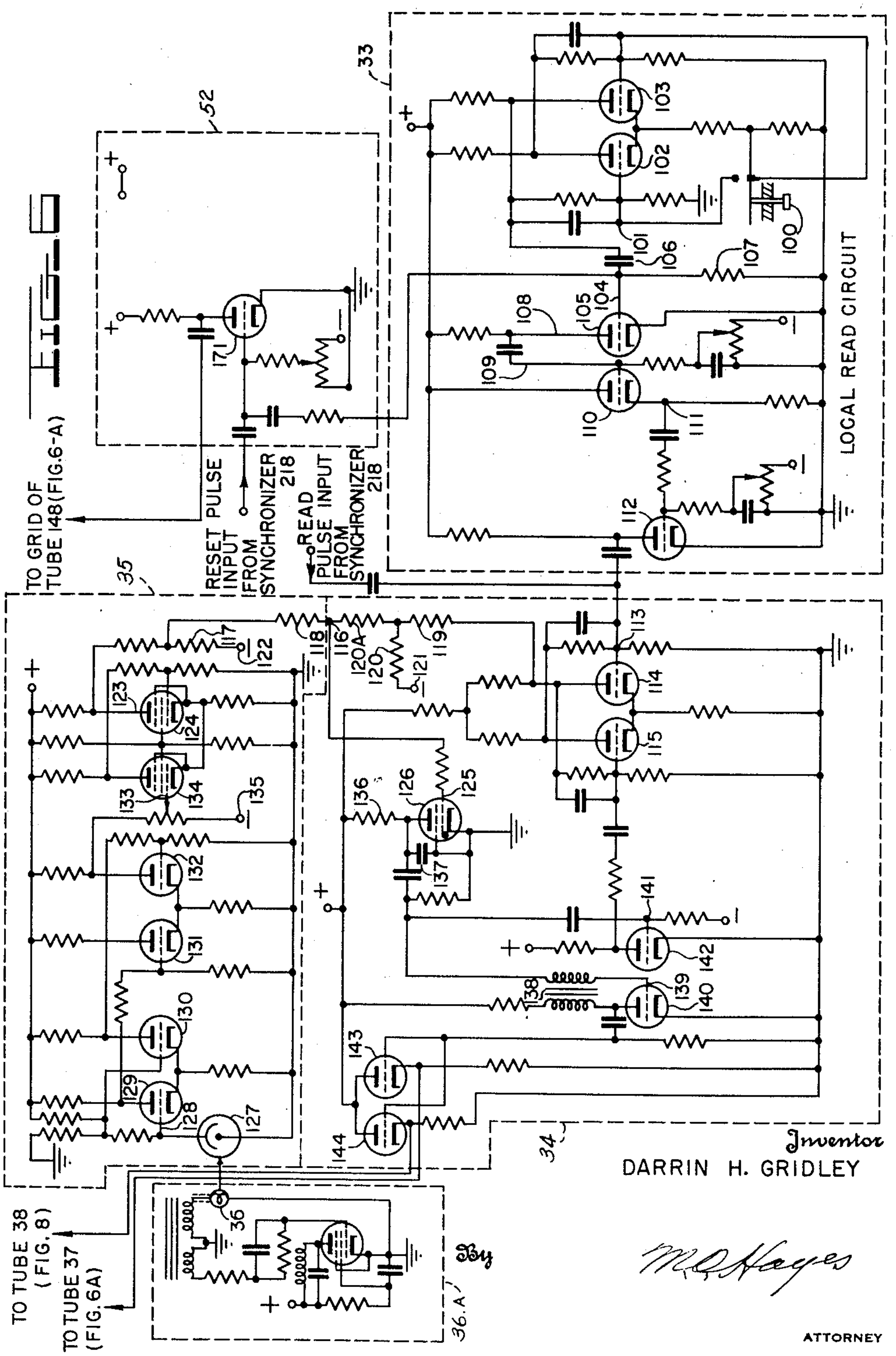
Figure 6A:
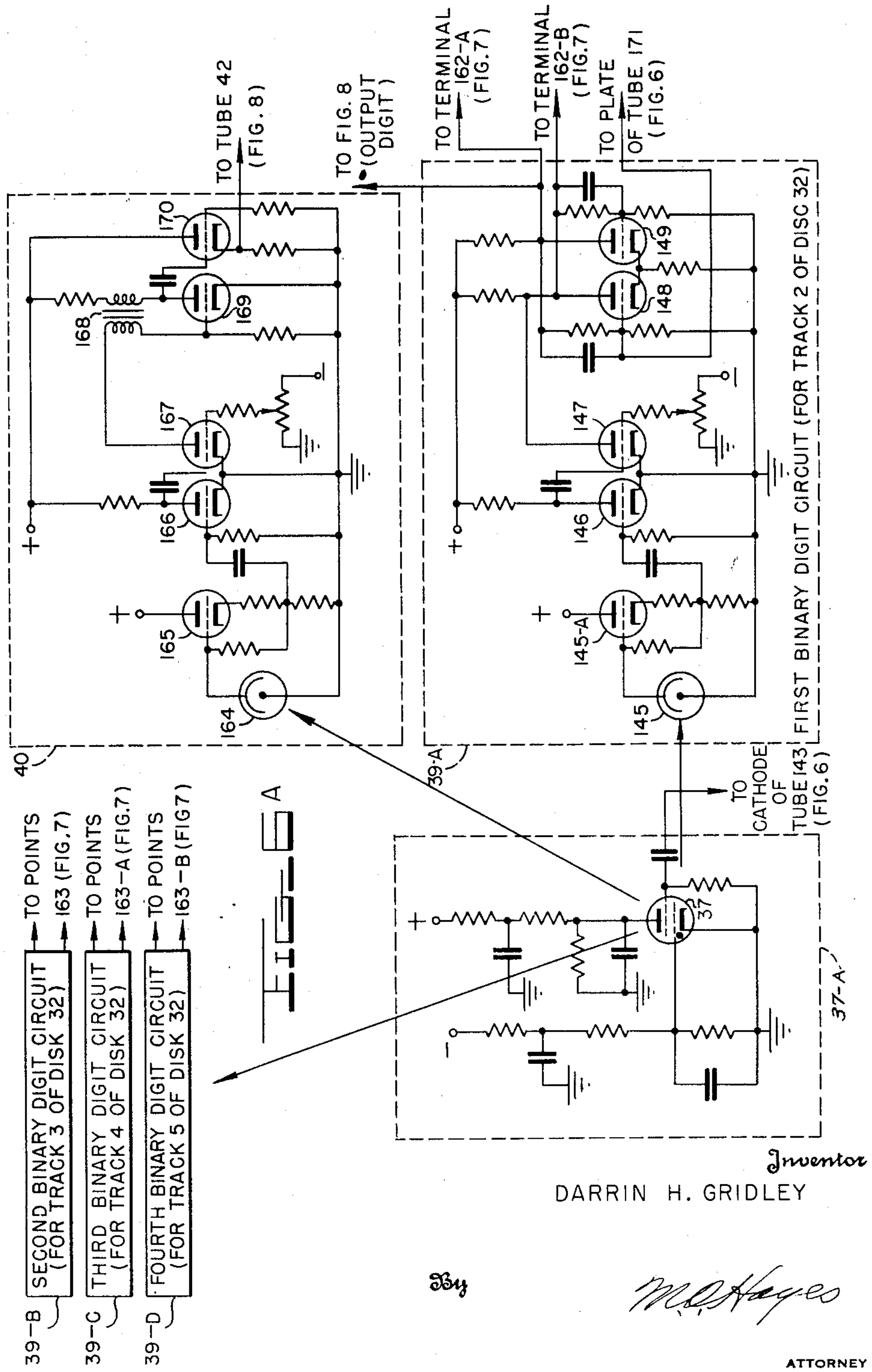

Figs. 6 and 6–A show in typical circuit diagram, storage circuits and light control circuits employed in a typical digital converter.

Figures 7, 8:
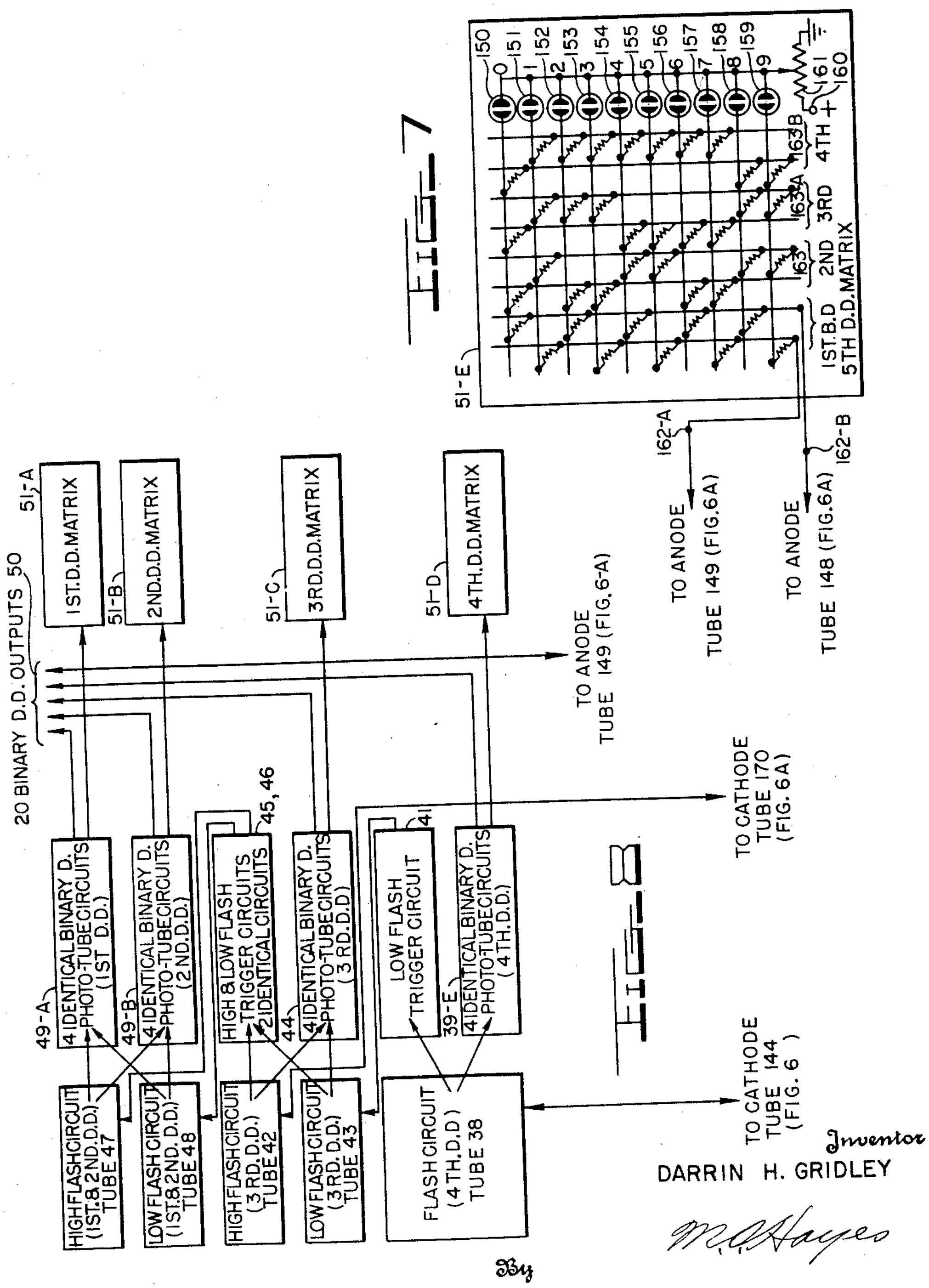

Fig. 7 shows a typical matrix employed to convert binary coded decimal representation of shaft position into a decimal digit representation and provide a visual indication.

Fig. 8 shows in block form, additional circuits of the general type shown in Figs. 6 and 6–A which are employed in the digital shaft position converter.

Figure 9:
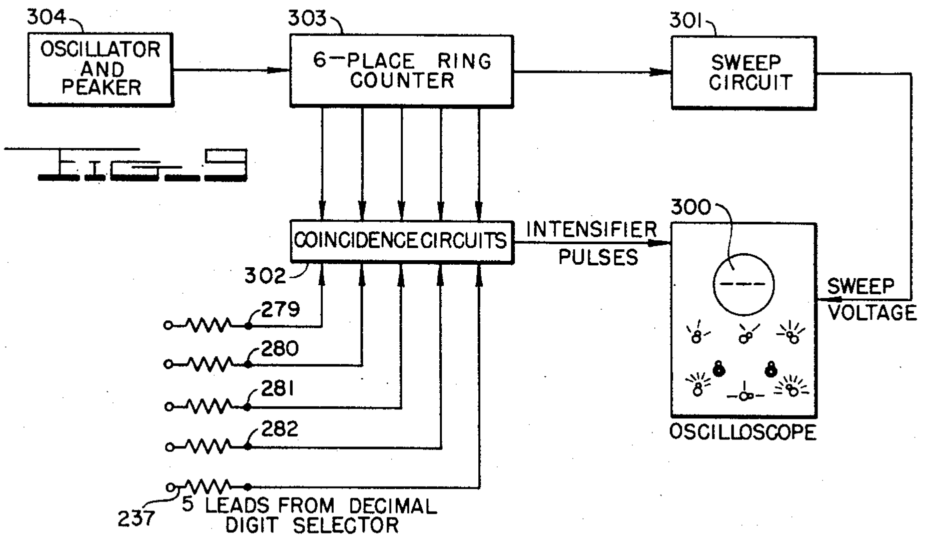

Fig. 9 shows in block form, sequencing equipment employed in the photographic recording of data.

Fig. 10 shows a section of an illustrative photographic recording of data.

Figure 11:
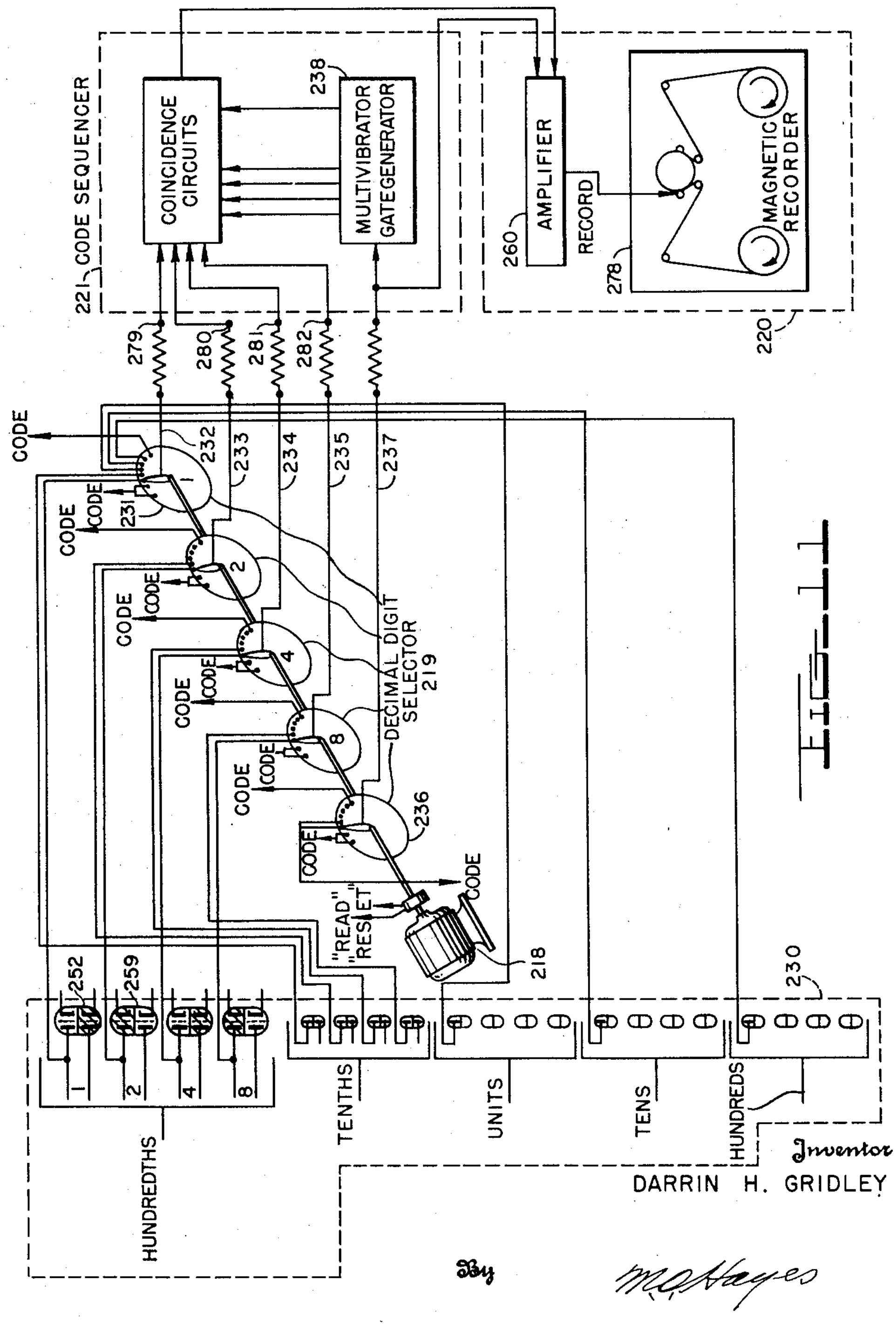

Fig. 11 shows partly in block form, selector and sequencing apparatus employed for the magnetic recording of data.

Figure 12:
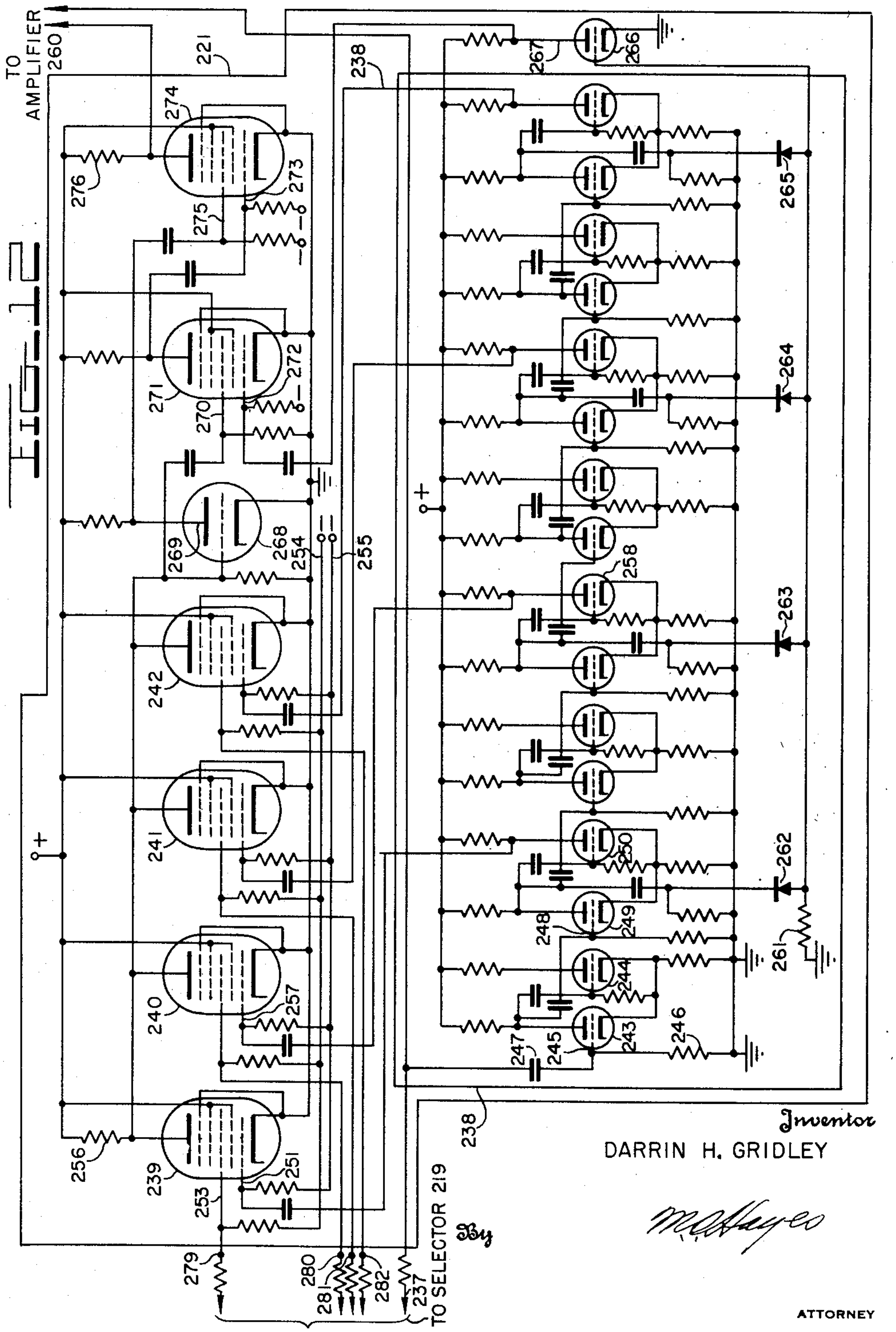

Fig. 12 shows circuit details illustrative of part of the equipment shown in block form in Fig. 11.

Figure 13:
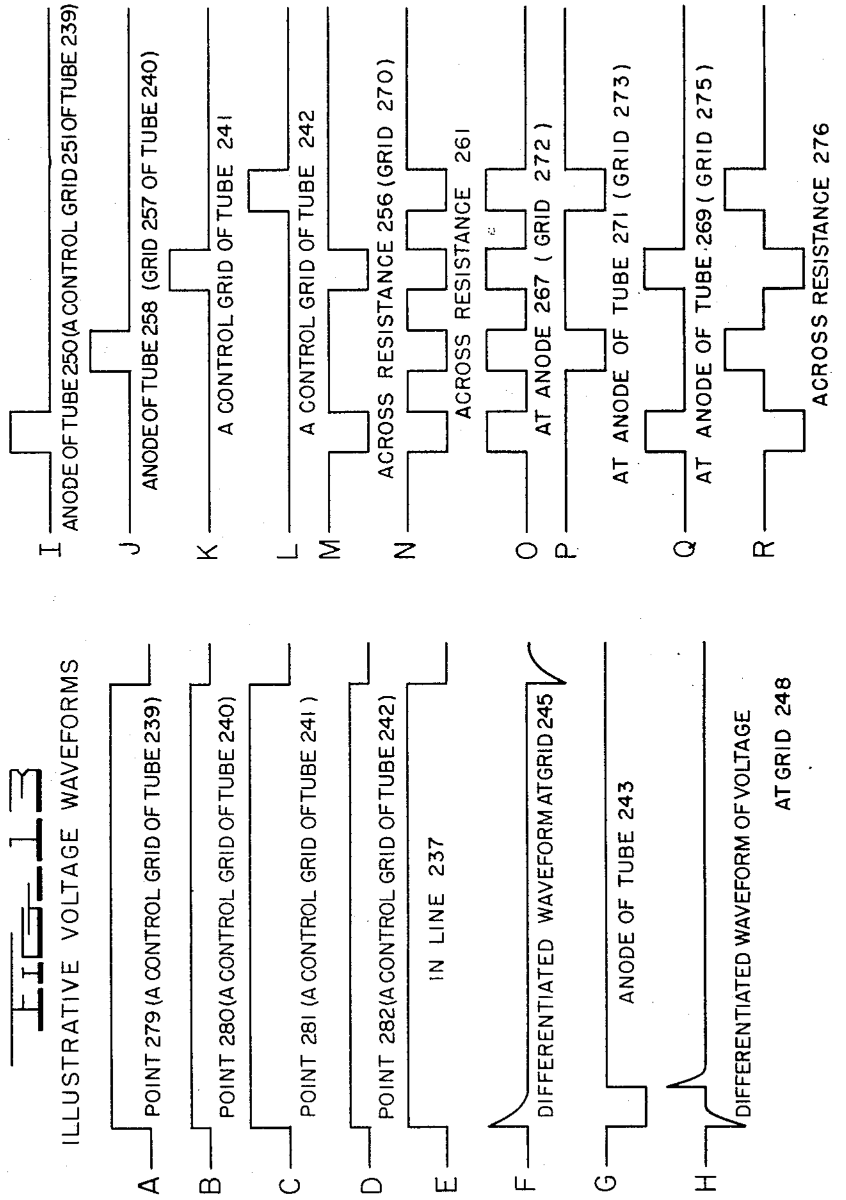

Fig. 13 shows waveforms illustrative of the operation of the apparatus of Figs. 11 and 12.

Figure 14:
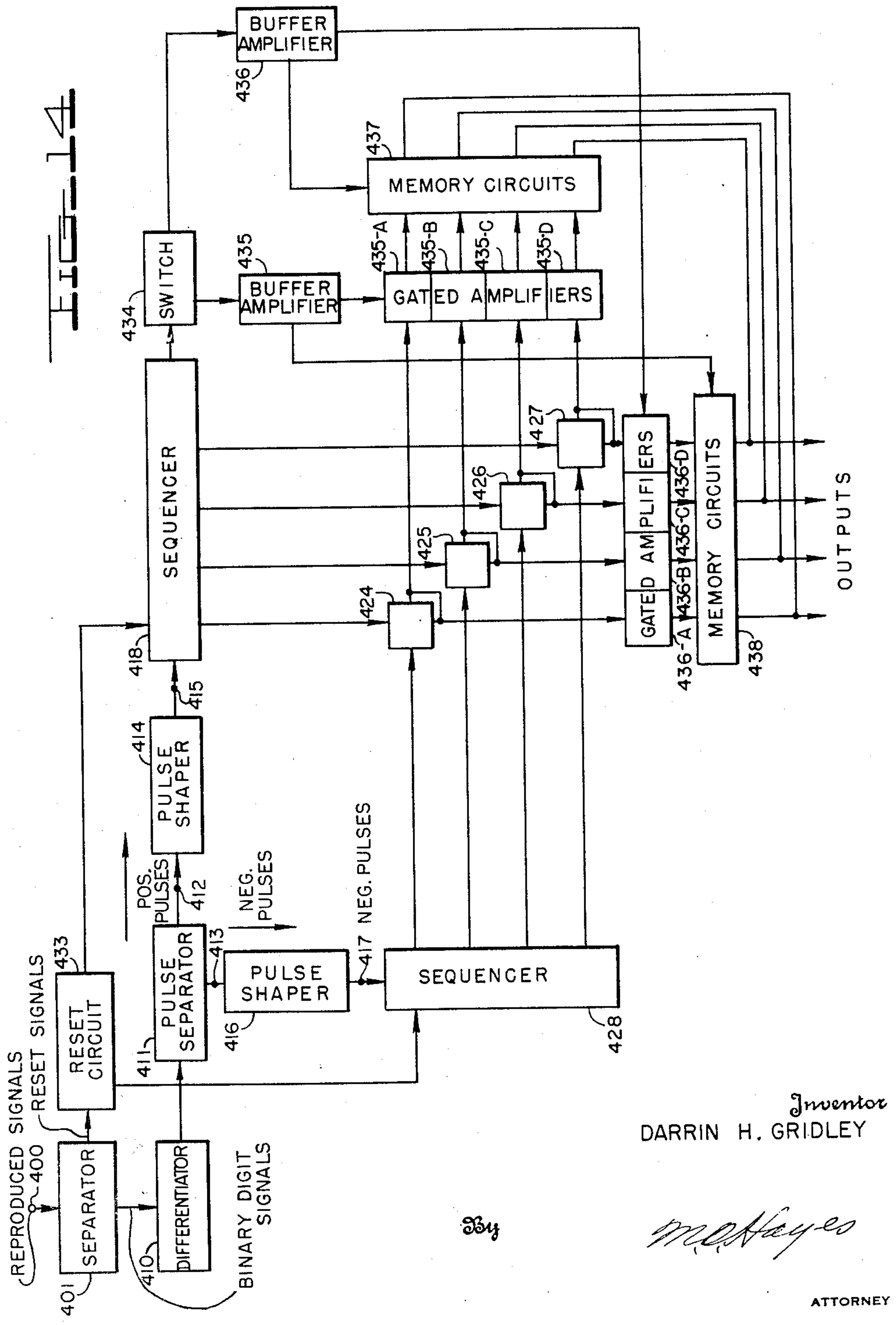

Fig. 14 shows in block form data sorter apparatus for magnetic storage equipment.

Figure 15:
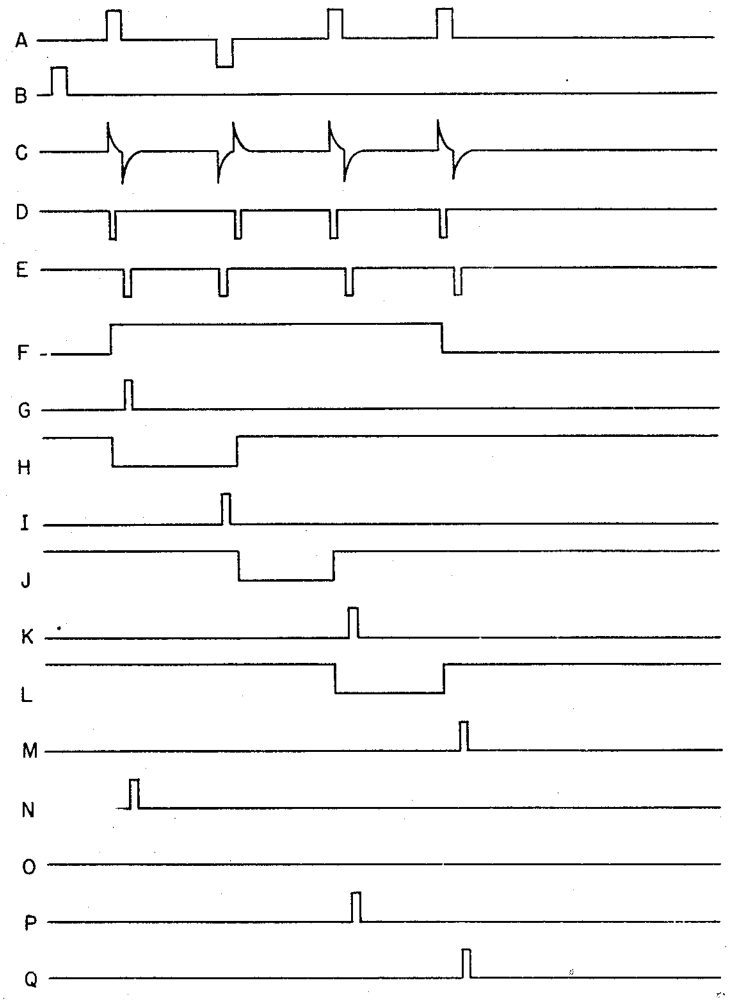

Fig. 15 shows waveforms illustrative of the operation of the circuit of Fig. 14.

In accordance with the fundamental teachings of the present invention a data conversion system is provided which will record and reproduce in usable form binary digital signals relative to the positions of a plurality of remote shafts. For each shaft involved, a digital shaft position converter unit, later to be described in detail, is employed to convert shaft position into binary digital form. Upon occurrence of a "Read" signal, each converter unit makes a reading of the corresponding shaft position accurate typically to the 100th part of a degree of rotation. To obtain a shaft position accuracy of a 100th part of a degree requires a decimal numeral having five digits in all. This reading as here obtained is in binary digital form, each decimal digit of the typical five required to give angular position to such accuracy being represented as four binary digits. The conversion units, which may thus derive binary digital information at substantially the same instant of time, hold this information for such time as is required for the sequential delivery thereof, to a single output channel. The combined information is then recorded or stored to provide a reproducible signal following which the conversion units are cleared preparatory to making a succeeding reading.

The recording thus made may be played back when desired, the resulting signal being supplied to decoding and resolving equipment to obtain separate information in a usable form, which may typically be teletypewriter code, binary digital code or decimal digit representation.

Binary digital representation is employed in the typical apparatus even though four binary digits are required for each decimal digit because of the ease of handling and the fact that binary digits with just two conditions such as the states off-on, high-low, plus-minus, etc. can be represented by the two states of electronic dual stability trigger circuits. Errors due to amplitude variations are eliminated because just the two extremes are effective to transmit the binary information.

Figure 1:
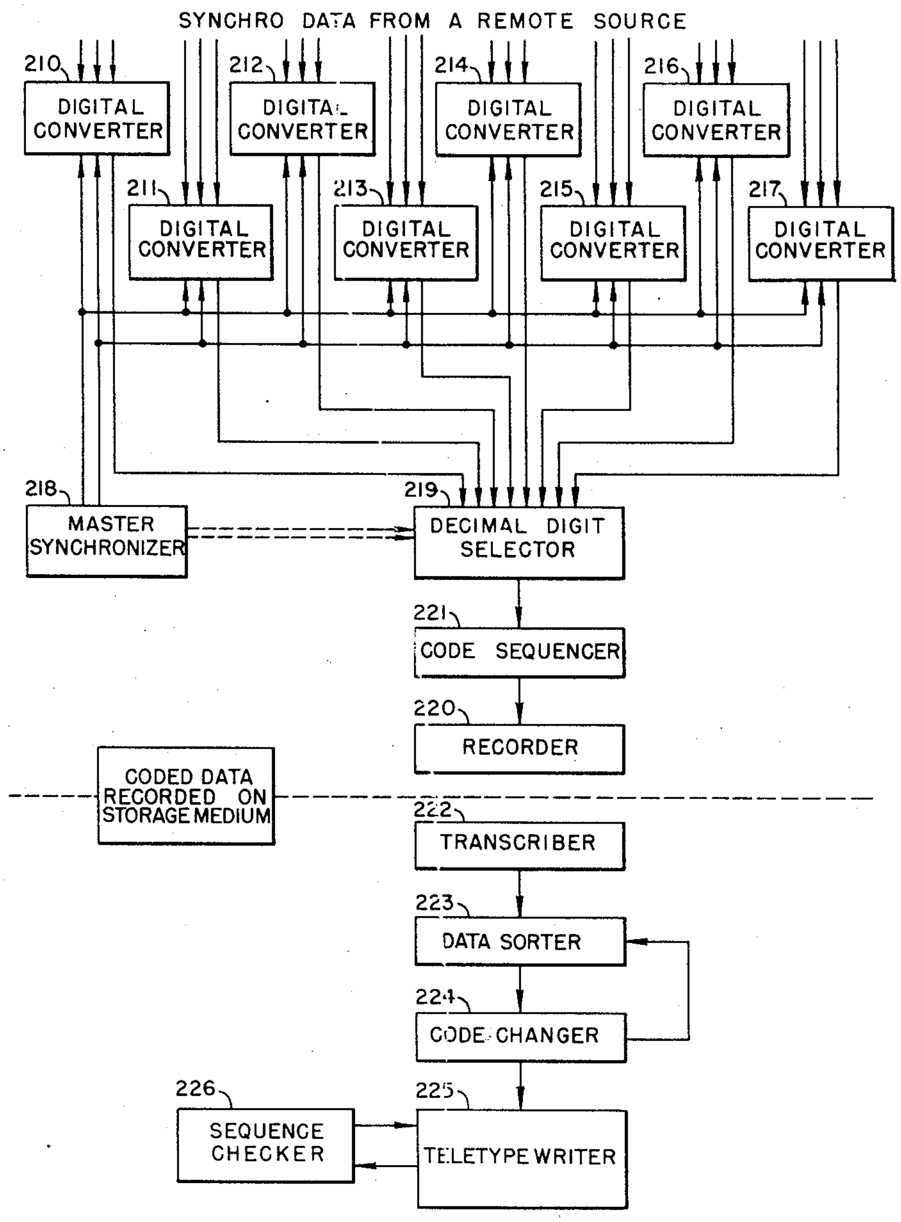
Fig. 1 is a block diagram of a system embodying the features of the present invention.

With particular reference to the overall system as represented by the block diagram of Fig. 1, shaft position may typically be supplied either directly or through a synchro system to each of the digital converters 210, 211, 212, 213, 214, 215, 216, 217 independently. The eight digital converters here employed would be satisfactory to handle eight variable shaft inputs.

The digital converters, as will be described in detail later convert the information contained as angular shaft position into a decimal number which in turn is represented by binary coded combinations. Typically where it is desired to deliver shaft position information accurate to the hundredth part of a degree of rotation, five decimal digits are required and each decimal digit is represented by four binary digits. Thus possibly twenty binary digits are delivered by each converter to represent the position of the shaft associated therewith. The digital converters respond to regularly recurrent signals produced by a master synchronizer 218 to produce the binary digit signals regarding shaft position.

The first type of signal produced by the master synchronizer 218 is a "Read" signal which is delivered to all digital converters 210 through 217 simultaneously. As will be seen later this signal causes twenty storage trigger circuits in each converter to attain conducting states indicative of the binary digits representing shaft position. The 160 various storage trigger circuits, 20 in each of the eight digital converters, subsequently remain in the condition thus established until a second signal "Reset" from the master synchronizer 218, again delivered to all converters in parallel, returns all storage trigger circuits to reference positions. In the interval of time between the delivery of a "Read" pulse and the delivery of a "Reset" pulse, the master synchronizer 218 initiates operation of a decimal digit selector 219 which in turn sequentially delivers the binary digit signals obtained from the digital converters 210 to 217 to a suitable recorder 220.

As will later be described the decimal digit selector includes at least four output channels one for each binary digit used in representing any of the decimal digits from 0 to 9.

The digital converters 210 through 217 can become quite complex where it is necessary to derive and present in binary digital form accurate shaft positional information containing five decimal digits correct to the hundredth part of a degree, for this reason considerable explanation of a typical converter structure and operation is desirable.

Figure 2:
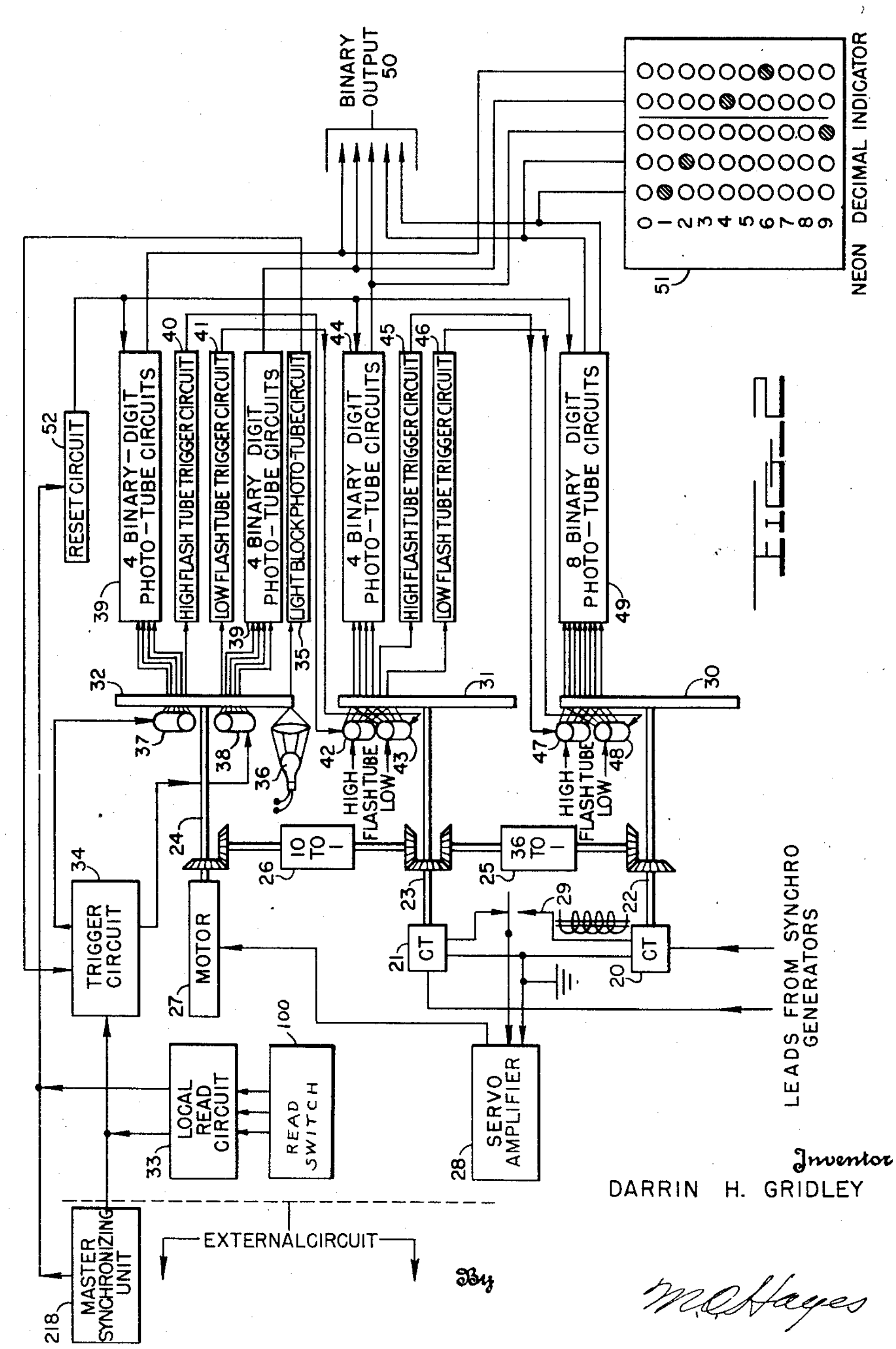
Fig. 2 is a block diagram of a converter system for deriving digital representation of the position of a movable shaft.

With particular reference now to Fig. 2, a block diagram of a digital converter unit constructed in accordance with the teachings of the present invention is shown. This unit is capable of receiving an input signal such as a remote synchro signal regarding shaft position or a mechanical shaft position signal itself and produce therefrom a binary coded electrical signal suitable for the operation of a calculator or the production of a visually indicated signal which an operator can record, both signals being accurate to the 0.01 part of a degree of rotation.

In many applications of a device of this sort the converter unit may be placed remote from the device containing the shaft whose displacement is to be determined. Because of this situation, the converter system is shown as supplied with information by a standard synchro data transmission system wherein the position of the remote shaft is transmitted to the converter as an electrical signal. For a high degree of accuracy in determining shaft position a two speed synchro system is employed, with two synchro generators geared to the remote shaft and two synchro transformers employed at the converter. The two synchro transformers are indicated in Fig. 2 by numerals 20 and 21 each operating to generate an error voltage corresponding to difference in angular positions of their respective armatures and the armatures of the corresponding generators located at the remote shaft. The first synchro system including the synchro transformer 20 operates at unity angularity, that is, in unison with the shaft whose displacement is to be recorded, while the second system including synchro transformers 21 is geared to operate at a 36 to 1 angularity step up ratio such that for every degree of rotation of the original shaft, 36 degrees of rotation of the high speed synchro system take place.

The armatures of synchro transformers 20 and 21 are driven as hereinafter described in detail by a servo control motor system including a servo drive amplifier 28 and servo motor 27. Shafts 22 and 23, are associated with the armatures of synchro transformers 20 and 21 respectively, are geared together by the 36 to 1 ratio gear box 25 while the positions of these shafts are indicated by discs 30 and 31 which are calibrated in a binary digital code as later described.

For further accuracy in the converter system the shaft 23 is driven from motor shaft 24 through a 10 to 1 step down gear box 26, and the position of motor shaft 24 is indicated by a third disc 32 which is also calibrated in a binary code as hereinafter described. Thus input signals regarding the position of a single remote shaft which may assume any position throughout its 360 degrees are resolved in the digital converter to motion of three shafts, 22, 23, 24 which respectively operate, in unison with the remote shaft, at 36 times the angular displacement of the remote shaft, and at 360 times the angular displacement of the remote shaft. The gear boxes which maintain this angularity are indicated by numerals 25, 26 and may typically involve split, spring loaded spur gears to minimize backlash.

Since shaft 24 must be capable of rather rapid movement after a 360:1 step up, a servo motor 27 is provided to drive this shaft in dependency on the input signals from the remote servo mechanisms. The control of this motor is accomplished through a servo drive amplifier 28. With such servo motor drive it is now apparent that the synchro transformers 20, 21 are not of a type which drive the shafts 22 and 23 directly but are of a type which derive "error" or "control" signals in proportion to any difference in the angular orientation of the remote synchros and the shafts 22 and 23. This "error" signal is used from only one of the synchro transformers 20 or 21 at any time as controlled by relay 29. Normally the synchro transformer 21 is employed to generate an error signal but whenever the magnitude of the "error" signal indicates that the shaft 22 is more than 2½ degrees out of phase with the remote shaft, relay 29 is operated to change the signal input for servo drive amplifier 28 so that it is received from synchro transformer 20. This action is provided to secure a greater degree of accuracy and is accompanied by a corresponding 36:1 step-up at the remote shaft. In practice it has been possible to construct such shaft position equipment in which the overall static error in positioning shaft 22 is less than 0.0025 degree.

Figure 3:
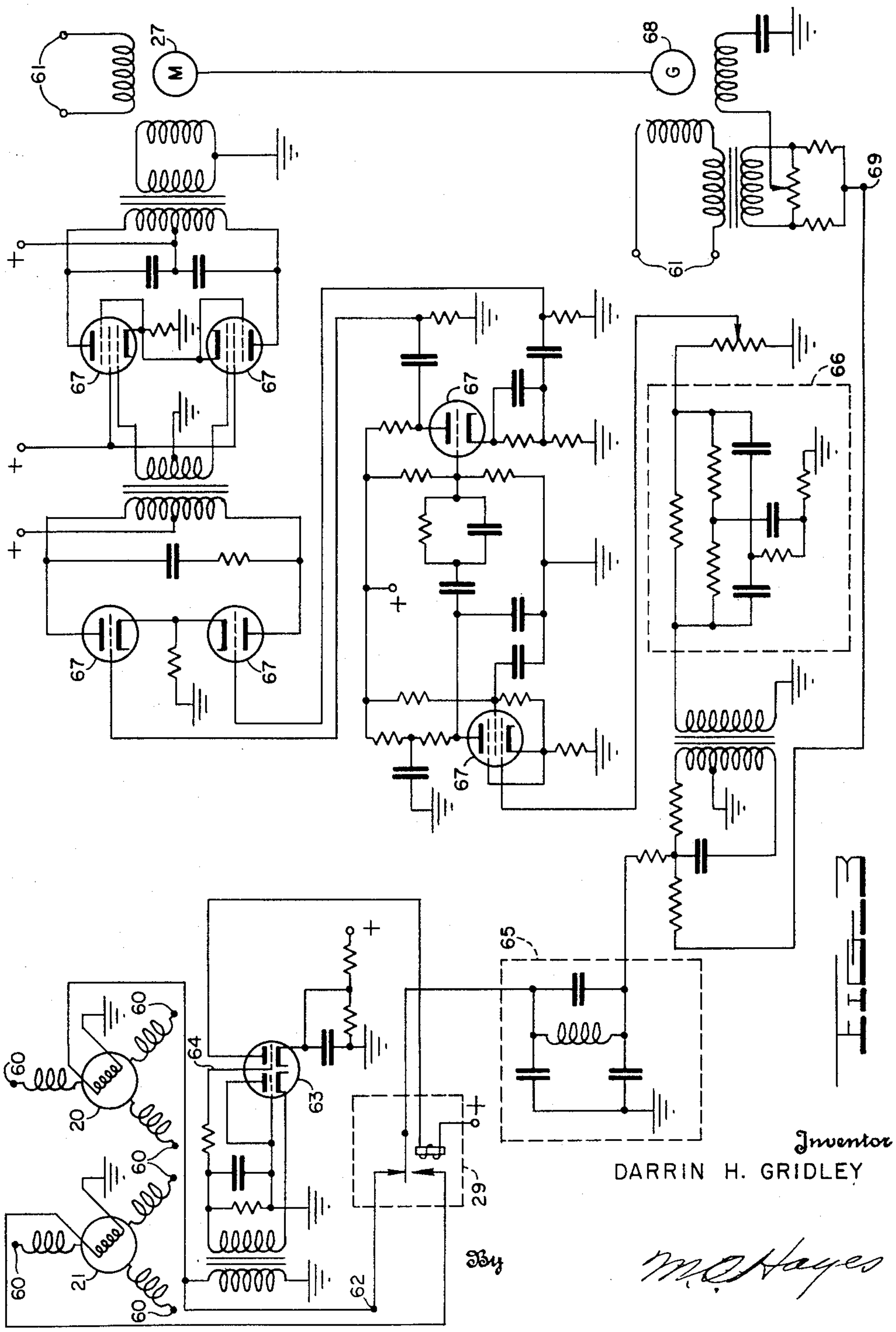
Fig. 3 is a circuit diagram of a typical servo system for delivering information relative to the position of remote shafts.

A schematic diagram of a typical servo drive amplifier 28 and the connections thereof to the synchro transformers 20 and 21 is shown in Fig. 3. Since in general such servo systems are well known in the art, the present system will be described only briefly. Synchro transformers 20, 21 are shown in Fig. 3 and have their input stator terminals 60 connected to corresponding stator windings of the synchro generators attached to the remote shaft. The A.-C. induced in the rotor of synchro transformer 20 by the signal from the remote 1-speed synchro generator produces an output signal which is applied to terminal 62. This signal, which in amplitude is proportional to the "error" or difference in the angular position between shaft 22 and the remote 1-speed shaft, is detected in a conventional manner by one section of tube 63, and applied, as a biasing voltage to grid 64. When the signal at point 62 is large, indicating a large error signal, grid 64 goes far negative terminating the flow of current through the coil of relay 29. With the coil of relay 29 thus deenergized, the contactor thereof is in the up position as shown, delivering the signal from the 1-speed synchro transformer 20 through the low pass filter 65 and the null detecting parallel T network 66 to the amplifier chain including a plurality of tubes 67. The output from the amplifier chain is applied to one field section of servo motor 27 to drive it reversibly.

Also connected to the shaft of servo motor 27 is a tachometer generator 68 which produces an output signal in line 69 which is combined with the signal supplied to the parallel T network 66. The tachometer provides a velocity feedback signal to compensate for velocity errors thereby providing a more accurate indicating system.

The parallel T network 66 provides a frequency compensating network which allows a larger amplitude signal to be passed into the servo amplifier at higher error signal frequencies. This has a tendency to increase the frequency response bandwidth of the entire servo system and the rapidity with which it can respond to position changes.

When the error signal from the synchro transformer 20 is of small amplitude such that the rectified signal supplied to grid 64 is not of sufficient magnitude to terminate the flow of current through the coil of relay 29, the contactor thereof drops to the lower position thereby applying the signal from synchro transformer 21 to the low pass filter 65. It is in this position with relation 29 energized that the equipment normally functions, the synchro transformer 20 being employed mainly to bring the equipment to a known reference position.

Referring again to Fig. 2, the purpose of the three shafts 22, 23, 24 will be seen to be to control the position of the three coded discs 30, 31, 32 attached thereto. For the purposes of providing a typical illustration, discs, 30, 31, 32 are shown in this connection as intended for photoelectric operation, however other suitable methods of imparting sufficient coding characteristic information to the discs might be employed. Typically, the discs 30, 31, 32 could be provided with selected alternate clear and opaque patches formed in a series of concentric intelligence tracks as shown in Figs. 4–A, 4–B and 4–C. The discs are calibrated in the decimal system peripherally and in a binary representation radially. These typical discs are arranged to provide in binary coded decimal form, information relative to the angular position of disc 30, and hence shaft 22, accurate to the 0.01 part of a degree. This binary coding is represented on the discs by two conditions, either a clear or an opaque section and with flash tube lighting, light will be delivered through the discs to photoelectric equipment in the clear condition of the discs and stopped in the opaque disc condition.

For illustration only, rotation of the discs 30, 31, 32 of Figs. 4–A, 4–B and 4–C to provide increasing angular readings may be taken as clockwise from the starting or reading 000.00 reference position. These 000.00 positions for the various digits are indicated by Figs. 4–A, 4–B and 4–C at the right for disc 30, the bottom for disc 31, at the left of disc 32 for the tenths and at the top of disc 32 for the hundredths.

The following first tabulation gives the value of the first decimal digit (hundreds) of shaft position as represented by one revolution of shaft (22) disc 30. For uniformity with other decimal digits the value is given in four binary digits by the first four inside tracks 5, 6, 7, 8 of disc 30 as measured from the outer track. (Note that the track number 7 is continuously opaque.)

| Angular Position in degrees of shaft 22 from reference 000.00 position | Condition of tracks on disc 30 numbered from outside | | | |
|---|---|---|---|---|
| | 5 | 6 | 7 | 8 |
| 000.00 to 099.99 | O | C | O | C |
| 100.00 to 199.99 | C | O | O | O |
| 200.00 to 299.99 | O | C | O | O |
| 300.00 to 359.99 | C | C | O | O |

C signifiies clear.
O signifies opaque.

To give the value of the second decimal digit of shaft position (tens), the first four outer tracks 1, 2, 3, 4 of disc 30 are employed. Since the second decimal digit is repeated 3.6 times in 360 degrees, the following tabulation of the values is similarly repeated 3.6 times in a complete traverse of the disc 30. This code is repeated for the angular interval 100.00 to 199.99 and 200.00 to 299.99. The first six code combinations appear in the angular interval between 300.00 to 359.99.

| Angular value of last four digits in degrees | Condition of tracks of discs 30 | | | |
|---|---|---|---|---|
| | 1 | 2 | 3 | 4 |
| 00.00 to 09.00 | O | C | O | C |
| 10.00 to 19.99 | C | O | O | O |
| 20.00 to 29.99 | O | C | O | O |
| 30.00 to 39.99 | C | C | O | O |
| 40.00 to 49.99 | O | O | C | O |
| 50.00 to 59.99 | C | O | C | O |
| 60.00 to 69.99 | O | C | C | O |
| 70.00 to 79.99 | C | C | C | O |
| 80.00 to 89.99 | O | O | O | C |
| 90.00 to 99.99 | C | O | O | C |

To give the value of the third decimal digit of shaft position (units), the tracks 1, 2, 3, 4 of the disc 31 as measured from the outside are employed. The additional tracks 5, 6 control the application of light to disc 30 and will be subsequently discussed. Disc 31 rotates at 36 times the angularity of disc 30. In other words each degree of rotation of disc 30 results in 36 degrees of rotation of disc 31. Therefore and to indicate the units digit the disc 31 will have a change in binary coding every 36° interval. The same binary coding is employed for the units digits as for the tens digits appearing in the appropriate tracks as follows:

| Angular value of last three digits in degrees | Condition of tracks of disc 31 | | | | | |
|---|---|---|---|---|---|---|
| | 1 | 2 | 3 | 4 | 5 | 6 |
| 0.00 to 0.99 | O | C | O | C | C | O |
| 1.00 to 1.99 | C | O | O | O | C | O |
| 2.00 to 2.99 | O | C | O | O | C | O |
| 3.00 to 3.99 | C | C | O | O | C | O |
| 4.00 to 4.99 | O | O | C | C | C | O |
| 5.00 to 5.99 | C | O | C | O | O | C |
| 6.00 to 6.99 | O | C | C | O | O | C |
| 7.00 to 7.99 | C | C | C | O | O | C |
| 8.00 to 8.99 | O | O | O | C | O | C |
| 9.00 to 9.99 | C | O | O | C | O | C |

Similarly the fourth decimal digit (tenths) is given by the four innermost tracks 7, 8, 9, 10 of disc 32. Disc 32 rotates at 360 times the angularity of disc 30. In other words each 0.1 degree of rotation of disc 30 results in 36 degrees of rotation of disc 32. Therefore to indicate the tens digit each 36 degree interval of disc 30 will be designated by a different binary code on the four innermost tracks. The same binary coding is employed as before appearing as follows:

| Angular value of last two digits in degrees | Condition of tracks | | | |
|---|---|---|---|---|
| | 7 | 8 | 9 | 10 |
| 0.00 to 0.09 | O | C | O | C |
| 0.10 to 0.19 | C | O | O | O |
| 0.20 to 0.29 | O | C | O | O |
| 0.30 to 0.39 | C | C | O | O |
| 0.40 to 0.49 | O | O | C | O |
| 0.50 to 0.59 | C | O | C | O |
| 0.60 to 0.69 | O | C | C | O |
| 0.70 to 0.79 | C | C | C | O |
| 0.80 to 0.89 | O | O | O | C |
| 0.90 to 0.99 | C | O | O | C |

The fifth digit (hundredths) is given by tracks 2, 3, 4, 5 of disc 32. Each 0.01 degree of rotation of disc 30 results in a 3.6 degree rotation of disc 32. Therefore to indicate the hundredths digit each 3.6 degree interval of disc 32 will be designated by a different binary code appearing on the outer tracks 2, 3, 4 and 5. Binary coding similar to that previously given is employed for this digit.

| Angular value of last digit in degrees | Condition of tracks of disc 32 | | | |
|---|---|---|---|---|
| | 2 | 3 | 4 | 5 |
| 0.00 | O | C | O | C |
| 0.01 | C | O | O | O |
| 0.02 | O | C | O | O |
| 0.03 | C | C | O | O |
| 0.04 | O | O | C | O |
| 0.05 | C | O | C | O |
| 0.06 | O | C | C | O |
| 0.07 | C | C | C | O |
| 0.08 | O | O | O | C |
| 0.09 | C | O | O | C |

As mentioned heretofore tracks 5 and 6 on disc 31 control the application of light to disc 30. This novel scheme has been incorporated to reduce the possibility of error in the control of light by the opaque and clear patches on disc 30. Since any source of light must provide a light beam having a finite width, it is apparent that a light source, however narrow, would cause an extension of the clear patches with consequent reduction in the length of the opaque patch of any given track and possibility of ambiguous readings at the juncture between adjacent clear and opaque portions. This could be in part compensated by purposely making the clear patches shorter and the opaque patches longer than geometry and uniformity of the angles on the discs dictates. Such an arrangement would still require extreme accuracy in adjusting the light source for disc 30. To avoid such reading difficulties, the light source arrangement shown in Fig. 5 is employed for illuminating disc 30.

This light source for disc 30 employs two high intensity flash tubes 47, 48 called high and low, respectively, which may be of a type commonly called strobotron. When actuated to make a shaft position reading, these tubes produce flashes of light as controlled by the tracks 5 and 6 on disc 31. The flashes of light from the flash tubes 47, 48 are focused through independent lens systems schematically indicated at 82 for delivery of a narrow line image to disc 30. Lens systems 82 therefore image two lines of light on disc 30 separated by less than one code patch increment or multiple thereof. Light transmitted through a given track of disc 30, from both tubes 47, 48 reaches the same area and eventually finds its way to a photo tube. Separate phototubes or separate Lucite rods 83 for light transmission to individual photo tubes are provided for each track. With the disc 30 in a position as shown in Fig. 5, the division between adjacent clear and opaque divisions is shown as centered over the Lucite rods 83 in a position which, with a single light source centered over line 84, would produce the effective widening of the clear patch because the division could move a substantial amount in either direction and still light could reach rods 83. From the paths of focused individual light rays from two light sources through disc 30 it is seen that the light from flash tube 47 is definitely passed while that from flash tube 48 is definitely cut off. In Fig. 4–B again, as will be described later light track 5 of disc 31 permits the high flash tube 48 to be energized during half of a revolution and light track 6 of wheel 31 permits the low flash tube 47 to be energized during the other half of a revolution. In Fig. 4–B one revolution of disc 31 corresponds to the angle covered by one clear or one opaque patch of track 1 of disc 30 of Fig. 4–C.

The 360 speed disc 32 in Fig. 4–A contains clear and opaque portions of tracks representing both the tenths digit (000.10) and the hundredths digit (000.01) regarding the position of disc 30 as well as additional tracks which control the application of light to disc 31 and one track which, through a continuous light source, controls the reading positions from disc 32 itself. Again the coding of the digit tracks is the same as previously given.

Tracks 6 and 11 on disc 32 in Fig. 4–A control the application of light to disc 31 as will also be subsequently described. For this purpose disc 31 is provided with two light sources and lens arrangements for the delivery of light obliquely through disc 31 to Lucite pick-up rods. Light track 11 of disc 32 controls the energizing of a low flash tube for disc 31. In this connection it is to be noted that the clear patches of tracks 6 and 11 of disc 32 do not alternate as do those of tracks 5 and 6 of disc 31. This arrangement illustrates the versatility of the present converter system. The eleven tracks of disc 32 require a long radial length and hence a long flash tube, practically twice the length of those required for discs 30 and 31. To permit the use of identical, short tubes for lighting the tracks of disc 32, two tubes are again used, however, instead of being placed side by side for oblique lighting as they are for discs 30 and 31, they are placed at an angle of 90 degrees around disc 32 and placed radially so that one illuminates tracks 1 through 6 and the other illuminates tracks 7 through 11. In this manner the apparent 90 degrees displacement of the clear patches of tracks 6 and 11 are resolved as also the 90 degrees displacement for the zero indices of the tracks 2, 3, 4, 5 for the hundredths digit with respect to the tracks 7, 8, 9, 10 for the tenths digit.

The possibility of an ambiguous reading by the "widening" of the clear patches of the tracks of disc 32 due to the width of the light beams from the flash tubes is removed by a second method. Instead of the dual, oblique scheme employed for the other discs a separate "read-out" track #1 is supplied. This track is substantially continuous, however it does have regular spaced opaque portions which correspond to the portions of the digit tracks in which ambiguous readings would be possible, namely, the dividing lines between adjacent clear and opaque sections. However, these opaque portions of track 1 hold external read-out circuits, which will be subsequently described, inoperative in these regions so that the entire converter output is suppressed. Thus a reading can only be made when disc 32 is in such position that all possible ambiguity is removed.

In passing it should be noted that the width of the opaque portions of track 1 on disc 32 is quite small, so small in fact, that unavoidable "hunt" or "oscillation" of the synchro system itself within the limits of accuracy previously stated will normally be sufficient to drive disc 32 so that it is possible to secure an accurate output.

The electrical system for combining and resolving the information supplied by the tracks on discs 30, 31, 32 can become quite complex, consequently, reference is again made to Fig. 2 for a block diagram of these circuits.

Whenever it is desired to manually initiate operation to obtain a shaft position reading, a manual switch 100 associated with the local read circuit 33 is operated to produce a signal which is delivered to trigger circuit 34. This signal, in combination with a signal delivered from the light-block photo tube circuit 35 when light from continuous source 36 is permitted to pass through the outer track (1) of disc 32, simultaneously fires the two flash tubes 37, 38 associated with disc 32. The pulse of light momentarily delivered to the tracks of disc 32 is either passed or blocked in each track depending upon the coding thereof at the particular orientation of disc 32. Light passed through the individual tracks of disc 32 is transmitted by separate paths, typically Lucite rods, to separate photo tubes in photo tube circuits 39. Individual electrical pulses simultaneously delivered from each of these photo tubes are amplified and used to individually select the conducting state of a trigger storage circuit associated therewith. These trigger storage circuits, four in number for each decimal digit, one for each binary digit, function as signal storage circuits to remain in the selected condition in dependency on the light transmitted to register a digit in the binary representation. Since disc 32 carries information relative to the hundredths and tenths decimal digits of the angular position, eight photo tubes and trigger circuits are required.

In addition to the phototubes required for the binary digital representation of the two decimal digits on disc 32, photo tubes are also required for the high-low selectors which control the application of the light to disc 31. The high-low selector photo tube output is amplified, shaped by high trigger circuit 40 and low trigger circuit 41 then transmitted to cause the firing of the appropriate light source high flash tube 42 or low flash tube 43 placed behind disc 31 parallel to a radius thereof at a fixed reference position.

Photo tube circuits 44 associated with disc 31 respond to the light transmitted through the units decimal digit tracks of disc 31 to store, in trigger circuits as for disc 32, binary digital information relative to the value of this decimal digit. Disc 31 carries only one decimal digit therefore only four of these photo tube-storage circuits are required. Disc 31 does carry two additional information tracks, which through the selective on-off alternating patterns of tracks 5 and 6 and photoelectrically responsive separate high and low trigger circuits 45, 46 control the application of energy to the separate high and low flash tubes 47, 48 placed behind disc 30 parallel to a radius thereof at a fixed reference position.

As previously mentioned disc 30 carries information relative to two decimal digits, the tens and hundreds, hence to resolve the information an arrangement of eight separate circuits comprises photo tube circuits 49.

In operation therefore it is seen that sequential firing of the appropriate light sources for discs 32, 31, 30 takes place. One track of disc 32 receives light continuously. When that track is clear, the flash tube light sources for disc 32 can be fired. Following this the appropriate flash tube for disc 31 is fired and then the appropriate flash tube for disc 30. The delay involved is not great, it may range typically from 50 to 100 microseconds in duration.

The information thus obtained is supplied through five decimal digit output circuits 50, each represented by a single line but having four conductors for four binary digits, to a suitable utilization device and to a local Neon tube decimal indicator 51 which provides in visual representation, a numerical indication of the shaft position in decimal digits.

A selected time after the local read circuit 33 supplies a "read" signal to trigger circuit 34 to start the above sequence of operations, a second signal produced by switch operation at the local read circuit 33, is delivered to the reset circuit 52 to return the trigger circuits in the photo tube circuits 39, 44, 49 to reference conditions ready for the next sampling.

In the overall apparatus of Fig. 1 the converter thus described for use with a single shaft is one of a group of converters required for a multiplicity of shafts. In such a group operation as previously described, the whole apparatus will supply binary digital information to a single recorder or computer for controlled sequential response to each converter separately. To do this, a suitable time sharing or sequencing control device is necessary because the information from each converter must be obtained at a specified time relationship to the others. For this purpose a master synchronizer 218 is provided which supplies the "read" signals to trigger circuit 34 and the "reset" signals to reset circuit 52 automatically instead of manually as previously described, and manual "read" and "reset" signals from local read circuit 33 are used only for manual checking of a single converter or manual sampling of individual shaft positions.

Typical circuits which would be suitable for the various additional blocks of the converter unit of Fig. 2 will now be described in detail to aid in the appreciation of the true magnitude and capabilities of the apparatus of the present invention.

Reference is now made to Fig. 6 which shows in typical circuit detail additional features of the invention. Reference numbers correspond to those previously given.

In the manually operated local read circuit 33 of Fig. 2, the read process is started by pressing button 100, Fig. 6. This action lowers the potential at the grid 101 of tube 102, which, together with tube 103 comprises a trigger circuit having two stable states. With the potential at the grid 101 thus lowered, tube 102 is brought to a condition of anode current cut-off and tube 103 is rendered conducting producing a drop in potential at the anode of tube 103. This drop in potential is communicated to the grid 104 of tube 105 through a short time constant coupling circuit including capacitance 106 and resistance 107. Tube 105 is biased as an amplifier through the return of its grid resistance 107 to ground. Thus the negative voltage surge is amplified and obtained as a positive pulse at anode 108. The short positive pulse from the anode 108 is supplied to the grid 109 of a tube 110 which is biased as an amplifier by the return of the grid to a negative potential. Tube 110 is connected in a cathode follower type circuit and is rendered more conductive by the positive signal from the anode 108 to produce a positive pulse type signal at the cathode 111 by cathode follower action.

This cathode follower output signal goes to two parallel paths. The first, that of the "Read" signal, goes through an inverter tube 112 where it is obtained as a negative pulse and supplied to the grid 113 of tube 114 which together with tube 115 comprises a trigger circuit of a type having two stable states. The negative pulse initiates a first state in the trigger circuit of tubes 114—115 in which tube 114 is rendered non-conductive producing a positive-going signal at the anode thereof and at point 116. Point 116 is also connected to the anode 123 of tube 124, which is part of a D.-C. amplification circuit responsive to photo tube 127, and to the grid 125 of tube 126. Tube 126 is preferably of the tetrode "soft" variety, however the combination of normally conducting tubes 114 and 124 with the mixing resistors 117, 118, 119, 120, 120-A and the bias sources 121, 122 holds tube 126 non-conductive.

The conductivity condition of tube 124 is controlled by a photo tube 127 responsive to the beam of light from continuously operative light source 36. This beam of light must pass through the outer track 1 of disc 32 and is interrupted momentarily as previously described whenever it is possible for the apparatus to make an ambiguous response. The oscillator circuit which supplies power to light source 36 is not critical, and it is designed and indicated in block 36-A to provide as constant a power delivery to light source 36 as possible. When the position of disc 32 is such that it is impossible to make an ambiguous reading, photo tube 127 is rendered conductive by the beam of light to drop the potential at the grid 128 of tube 129 which together with tubes 130, 131 and 132, 134 and 124 forms a D.-C. amplifier circuit of a highly stable nature. The last tube of the circuit, tube 124, is held conductive whenever the light from light source 36 to photo tube 127 is interrupted, placing a negative holding voltage at point 116. This negative voltage is altered whenever the photo tube 127 receives light rendering tube 124 non-conductive.

Upon the simultaneous occurrence of the non-conductive condition in tubes 114 and 124, point 116 is raised in potential so that the grid 125 connected thereto initiates conduction in the "soft" tube 126. This conduction lasts for only a short period of time being extinguished by the voltage drop across resistance 136 after capacitance 137 discharges.

This variation in the potential at the anode of tube 126 is applied through the transformer 138 to the grid 139 of of tube 140. The circuit of tube 140 functions somewhat regeneratively producing at the anode of tube 140, a short duration one cycle somewhat sinusoidal oscillatory variation which is initially positive in direction.

The one cycle somewhat sinusoidal oscillation thus generated is also applied to the grid 141 of switch tube 142. The initial direction of the oscillation is negative by virtue of the coupling in transformer 138 and hence is initially ineffective, however, the second half cycle (positive going) of the grid oscillation brings tube 142 to anode circuit conductivity. Thus is produced a negative pulse at the anode of tube 142 which is applied to the trigger circuit of tubes 114, 115 to effect the return thereof to its normal condition wherein conductivity by tube 114 prevails.

The oscillation produced at the anode of tube 140 is applied in parallel to the grids of a pair of tubes 143, 144 which are arranged in cathode follower circuits. The first (positive) half of the oscillation drives tubes 143, 144 to a condition of heavy conductivity producing large positive signals at the cathodes which are applied in parallel to the flash tubes 37 (of block 37-A) in Fig. 6-A and 38 in Fig. 8 which are connected in suitable flash tube circuits of conventional arrangement. These tubes 37, 38 supply light to tracks 2 through 11 of disc 32.

Light transmitted through tracks 2, 3, 4, 5, and 6 of disc 32 originates in flash tube 37 (Fig. 6-A) and is delivered individually from each track to separate binary digit photo tube circuits typified by that in the block numbered 39-A shown in Fig. 6-A, to which reference is now made.

Activation of flash tube 37 delivers light to photo tube 145 if the condition of the corresponding track of disc 32 is clear at that instant. Photo tube 145 is thereby rendered conductive producing a potential change which is applied through the isolating tube 145-A to a two stage amplifier and shaper circuit of tubes 146, 147. A resulting negative signal obtained at the anode of tube 147 is applied to a trigger circuit having tubes 148, 149 in which the reference condition requires conduction in tube 149, thereby rendering tube 148 conductive to reverse the reference condition.

Additional light from flash tube 37, when passed by clear patches of corresponding other tracks 3, 4, 5 similarly causes other trigger circuits of the type having tubes 148, 149 for the other binary digits to change from their reference condition to the opposite condition. Various combinations of the conduction conditions of the four trigger circuits for each decimal digit then partially establish the position of disc 32 giving the value of the hundredths decimal digit of the shaft or disc position.

This value may be read visually by means of a neon tube decimal digit indicator, the connections thereto being typified by those to the tubes for the hundredths digit of which are indicated schematically in block 51–E of Fig. 7. The ten neon tubes 150, 151, 152, 153, 154, 155, 156, 157, 158, 159, represent values of the hundredths digit of 0, 1, 2, 3, 4, 5, 6, 7, 8, 9 respectively and are connected to a positive potential source 160 through a potentiometer 161, then through a resistance matrix to the storage trigger circuits such as that of tubes 148, 149 of Fig. 6–A. Thus points 162–A and 162–B which give the first binary digit representation of the value of the fifth decimal digit (hundredths) are connected to the anodes of tubes 149, 148, respectively, of Fig. 6–A. In like manner points 163 giving the second binary digit representing the value of the fifth decimal digit (hundredths) would be connected to anodes of a corresponding trigger circuit responsive to a beam of light passing through track 3 of disc 32 and so on, points 163–A and 163–B being connected to trigger circuits responsive to light through tracks 4 and 5 respectively of disc 32.

In Fig. 7, the matrix resistors, all of equal value, are so arranged that all anodes of trigger circuit tubes connected to a given neon decimal indicator tube must be up in potential (tube non-conductive to permit the neon indicator to glow. Typically to indicate the numeral 3 the following condition must prevail. The anode of the right tube (149) for the first binary digit (track 2 of disc 32) must be non-conductive. The anode of the right tube for the secondary binary digit (track 3 of disc 32) must be non-conductive. The anode of the left tube for the third binary digit (track 4 of disc 32) must be non-conductive. The anode of the left tube for the fourth binary digit (track 5 of disc 32) must be non-conductive.

In the same manner flash tube 38, Fig. 8, having associated circuitry similar to that for flash tube 37, operates photo tube circuits 39–E Fig. 8, to display the value of the fourth decimal digit, tenths digit, in another row of neon tubes in matrix 51–D in dependency on the clear or opaque condition of the tracks 7, 8, 9, 10 of disc 32 in combinations previously given.

Typical of the control circuits for the oblique lighting high and low flash tubes 42, 43, 47, 48 of Fig. 8 is the high trigger circuit in block 40 Fig. 6–A which controls the firing of tube 42. Referring again to Fig. 6–A this circuit contains photo tube 164, isolating tube 165, a two-stage amplifier of tubes 166, 167, a transformer operative pulse tube circuit including transformer 168 and tube 169 similar to the circuit of similar transformer and tube 138, 140 of Fig. 6, and a cathode follower type output stage having tube 170. Photo tube 164 is actuated by light from flash tube 37 controlled by the selector track 11 of disc 32. In effect the circuit of block 40 will cause high flash tube 42 to be fired just a fraction of a second after flash tube 37 is ignited provided the clear patch of track 11 on disc 32 is in register.

A similar low trigger circuit 41, Fig. 8, controls the firing of the low flash tube 43 for disc 31 whenever the track 6 of disc 32 is clear to permit passage of light from flash tube 38

This typical circuitry is followed for the rest of the apparatus shown in block form in Fig. 8. Tube 43 is the low flash tube for disc 31 and tube 42 is the high flash tube. These tubes cooperate with four binary digit photo tube circuits 44 each of the type shown in detail in blocks 39–A of Fig. 6–A to produce from the disc 31 the third decimal digit to be displayed on matrix 51–C.

The high and low trigger circuits 45, 46 responsive to the high and low flash tubes 42 and 43 as controlled by the high and low selector patches in tracks 5 and 6 of disc 31 control ignition of high and low flash tubes 47, 48 for disc 30.

Again, high and low flash tubes 47, 48 send light through the tracks 1, 2, 3, 4 of disc 30 to control the response of four identical binary digit photo tube circuits for the second decimal digit which is displayed by matrix 51–B. Similarly these same tubes 47, 48 with tracks 5, 6, 7, 8 of disc 30 control the response of four additional binary digit photo tube circuits 49–A to deliver information relative to the first decimal digit on matrix 51–A.

With the apparatus thus described it is possible to obtain a visual representation of the position of a remote shaft accurate to the 0.01 part of a degree by the neon tubes in the matrix assembly 51. Such a representation may be obtained simply and rapidly by merely pressing the button 100 and the reading of the neon tubes will be retained as long as button 100 is held in. When button 100 is released, spring action will return the contacts controlled thereby to the "Reset" position as shown in Fig. 6, reversing the condition of the trigger circuit of tubes 102, 103, rendering tube 102 conductive. A differentiated positive pulse resulting is obtained at the grid 104 of tube 105 and delivered in parallel to a plurality of reset buffer circuits typified by that of tube 171. Tube 171 is provided with a cut-off biasing voltage so that input negative signals are ineffective. The negative pulse from the anode of tube 171 is applied to the grid of tube 148, Fig. 6–A, to bring the trigger circuit of tubes 148, 149 to the reference condition in which tube 149 is conductive.

The buffer circuits typified by that of the tube 171 (Fig. 6) are equal in number to the number of binary digit photo tube circuits (20) so that all trigger circuits can be brought to reference conditions and are isolated from each other.

For the operation of external circuits in dependency on the binary information contained in the storage trigger circuits typified by that of tubes 148, 149 or the recording of that binary information, twenty binary digit output circuits 50 are provided in Fig. 8. These output circuits are connected to the decimal digit selector 219 (Fig. 1) for sequential operation with other digital shaft position converters of the overall system.

With reference now to Fig. 11, details of the master synchronizer 218, decimal digit selector 219, code sequencer 221 and a typical recorder (magnetic tape) 220 are shown. To illustrate more fully the method of interconnection of the various components, connections are shown to the trigger tube storage circuits in block 230 in a typical digital converter. As shown connections may be made to the plates of the trigger circuits tubes, one connection to each pair of tubes. The twenty trigger circuits are indicated individually by the ovals including two separate triodes in each. Thus each oval represents one trigger circuit. Connections to all circuits are not shown to avoid undue complexity of the drawing, however the same general scheme is followed for all.

With connections as shown in block 230 made to the upper plates of the tubes of the trigger circuits, a lead from each one goes to a terminal on a decimal digit selector switch 219 which contains five multi-contact wafer switch sections each providing sixty possible contact positions in the complete periphery. The wafers of the decimal digit selector are rotated by the master synchronizer 218 which may be a constant speed motor.

Wafer 231 is allotted to the selection of the first binary digit (1) of the decimal digits of shaft position, and for that reason is connected to the first binary digit trigger circuit in each group of four circuits, sampling the first binary digit for each decimal digit of the five digits in sequence, then sending a code signal in the next position before moving to other positions for representation of other shaft position information from a second digital converter.

With the synchronizer 218 providing typically clockwise motion in the wafer contactors as shown in Fig. 11, the contacts initially in the position above, which as subsequently will be described is the #3 position, will connect the trigger circuits containing the binary digits for the hundredths decimal digit of shaft position to the lines 232, 233, 234, 235. Thus to indicate a typical hundredths numeral 5, the first binary digit and the third binary digit will be in similar conditions with the connected plate of each being at high potential. At the same time the connected plates of the second (multiples of 2) binary digit and the fourth (multiples of 8) binary digit will be at a low potential. The result is a high potential in lines 232 and 234 and a low potential in lines 233 and 235 shown by waveforms A, B, C, D of Fig. 13. At the instant the contactor of the decimal digit selector 219 reaches this position, wafer 236 applies a fixed positive voltage to line 237, which in turn supplies a multivibrator gate generator 238 to initiate the production of a series of four gating pulse signals. These gate pulse signals are typified in waveforms I, J, K, L of Fig. 13 and are produced in separate lines in response to the signal of waveform E.

The wafer output signals in lines 232, 233, 234, 235 are "read out" in sequence by coincidence circuits in code sequencer 221 in response to the gate signals from multivibrator gate generator 238.

For illustration, the multivibrator gate generator 238 of Fig. 11 is shown schematically in Fig. 12 as composed of a plurality of serially arranged "one-shot" trigger circuits which produce the four gate pulses separated by distinct time intervals.

In a typical trigger circuit having tubes 243, 244, tube 244 is normally conductive. This condition is reversed however, upon application of a positive signal to grid 245 from line 237. This signal in line 237 is differentiated by a short time constant circuit having resistance 246 and capacitance 247 to provide positive operation of the circuit. The trigger circuit of tubes 243, 244 remains in the unstable circuit for a period of time determined in part by the time constant in the grid coupling circuit for tube 244. When the stable state is again realized, a positive signal is produced at the anode of tube 243. This positive signal is supplied to the grid 248 of a second one-shot trigger circuit to initiate conduction in tube 249. This type of interconnection and series triggering exists throughout the multivibrator gate generator for eight stages.

The gate pulse appearing at the anode of tube 250 is supplied to grid 251 of coincidence tube 239. It is positive in nature, delayed from the closure of contacts of wafer 236 as a result of the operation of the trigger circuit of tubes 243—244 to make certain that the contacts of all wafers of decimal digit selector 219 are closed. Thus in this third position of decimal digit selector 219 as shown the first binary digit trigger circuit is in such condition that a high positive potential is supplied to line 232 and thence to grid 253 of coincidence tube 239. Coincidence tube 239, as are all coincidence tubes, is biased from sources 254, 255 so that it is non-conductive except upon simultaneous applications of positive voltages to its grids 251, 253. Therefore coincidence tube 239 changes to a conductive condition for the duration of the positive signal from the anode of tube 250 to produce a negative polarity pulse signal across resistance 256.

In like manner, a positive pulse signal is subsequently applied to grid 257 of coincidence tube 240 from the anode of tube 258 of another single stability trigger circuit, however the low potential condition existing at point 280 (of Fig. 11) by virtue of the conductivity condition in trigger circuit 259 does not permit coincidence tube 240 to conduct to produce a negative pulse across resistance 256. This same action takes place throughout the multivibrator gate generator and the coincidence tube circuits to selectively produce negative pulse signals across resistance 256 in dependency on the conditions of the storage trigger circuits of the converters indicated generally in Fig. 11 in block 230.

Such a pulse signal waveform as obtained as the common anode connection of the coincidence tubes 239, 240, 241, 242 as shown by waveform M of Fig. 13 could be applied to a recorder amplifier 260 Fig. 11 directly, the pulse condition by its presence or absence at specified times indicating the condition of the binary digit trigger circuits in block 230, however, such a system of recording is subject to a greater error percentage and in the playback equipment considerable apparatus is required to determine the true signal to be delivered each time a pulse signal is absent. One way of positively identifying signals for this type of recording will be subsequently described in connection with a photographic recording. This way involves the recording of guide marker signals at regular intervals where pulses could occur.

The recording process now to be described involves the magnetic recording of negative and positive polarity pulses to indicate the two trigger circuit conditions definitely rather than just one polarity pulse to indicate one condition and no pulse to indicate the other condition. If the trigger circuit is in one condition, a positive signal is recorded. If it is in the other condition, a negative signal is recorded.

To produce positive and negative polarity pulse signals from the negative pulses or absence of pulses across resistance 256, additional amplifier tubes are included in the coincidence circuits of code sequencer 221 as shown in Fig. 12. A negative pulse signal is produced across resistance 261 which is connected through uni-lateral impedance elements 262, 263, 264, 265 to tubes of the multivibrator gate generator 238 each time the unstable condition is realized in a trigger circuit in the multivibrator gate generator connected to a coincidence tube. Thus typically when tube 239 becomes conductive as previously shown, the production of a negative pulse across resistance 256 will be accompanied by the production of a negative pulse of equal duration across resistance 261. The negative pulse will always be produced across resistance 261, however, regardless of whether or not one is produced across resistance 256. Therefore a negative pulse will be generated within the apparatus every time a binary digit sampling period occurs.

The negative pulses produced across resistance 261 are supplied to the grid of a normally conductive tube 266, interrupting momentarily the conductive condition therein, producing thereby a series of positive pulse signals at the anode 267.

Similarly, the negative pulses produced across resistance 256 are amplified and inverted by tube 268 to produce positive pulses at the anode 269.

The negative pulses from resistance 256 are also supplied to a grid 270 of coincidence tube 271. The positive pulse output from anode 267 of tube 266 is supplied to a second grid 272 of tube 271. Grid 272 is supplied with a negative bias of sufficient magnitude to hold coincidence tube 271 normally non-conductive even with zero bias on grid 270, however, a positive signal from anode 267 occurring when grid 270 is at zero bias will render coincidence tube 271 conductive. On the other hand, if it is opposed by a negative pulse at grid 270 conduction cannot occur. Thus in every digit position in which one of coincidence tubes 239, 240, 241, 242 is not rendered conductive, coincidence tube 271 is rendered conductive.

The signal from the anode of coincidence tube 271 is delivered to a grid 273 of another coincidence tube 274. Coincidence tube 274 also receives the signal from the anode 269 at its grid 275. Coincidence tube 274 is biased by both grids 273, 275 so that a condition of moderate anode circuit conductivity persists in the absence of pulse signal input.

A negative pulse signal applied to grid 273 will momentarily interrupt the flow of anode current in coincidence tube 274, producing thereby a positive pulse across resistance 276. On the other hand a positive pulse applied to grid 275 will momentarily increase the anode current flow in coincidence tube 274 to produce a negative pulse across resistance 276. Thus a negative pulse is produced across resistance 276 whenever the connected tube in a digital converter trigger circuit is non-conductive at the instant of sampling while a positive pulse is produced at the same point whenever the connected tube of a digital converter trigger circuit is conductive. It is this waveform that is supplied to recorder amplifier 260 of Fig. 11 to be recorded by the typical magnetic recorder 278 and is shown in waveform R of Fig. 13. Another signal that is delivered to amplifier 260 for recording is a signal of characteristic pattern delivered thereto from the line 237 each time a contact is "made" by wafer 236 of decimal digit selector 219. This signal of line 237 is delivered to amplifier 260 for separate amplification and shaping and eventual combination with the signals from the coincidence circuits (anode tube 274) for recording. These "straight-through" signals serve as reference or reset signals if needed in playback as will be subsequently described in connection with Fig. 14. All recording is made with the same head, the signal from line 237 as recorded appearing with characteristic form in sequence with the four binary digit signals.

With the production of negative and positive pulses indicative of the value of binary digits thus explained, a summarizing discussion of the sequencing of such pulses for information recording is in order. Referring again to the decimal digit selector 219 of Fig. 11, it has previously been stated that the rotary contactors of the five switch wafers are caused to rotate in a direction, clockwise as viewed, at a typical rate of ten revolutions per second. There are sixty contact positions on each wafer at which the rotary contacts can connect lines 232, 233, 234, 235, 237 to external circuits. As accurately as possible, the contact points on all the wafers are located so that all rotary contacts will be made simultaneously in each of the sixty positions. A selected position of the rotary contactors typified in Fig. 11 could be allotted to the presentation of binary digit information relative to the hundredths decimal digit of shaft position for a selected shaft. As this position is reached, lines 232, 233, 234, 235 are simultaneously connected to appropriate anodes of the hundredths decimal digit trigger circuit tubes and a positive pulse is delivered to the multivibrator gate generator 238 from line 237. Thus in sequence, the potential existing in these lines 232, 233, 234, 235 is "read-out" appearing at the anode of coincidence tube 274 as a sequential group of negative and positive pulses.

After read-out of this hundredths decimal digit has taken place, continuous rotary motion of the wafer contactors moves them to the next clockwise position to read out the binary values for the tenths decimal digit, which in turn appear in sequence at the anode of coincidence tube 274. This action continues as the contactors of decimal digit selector 219 rotate, reading out the values of the digits in sequence until the shaft position information is complete after the seventh position (for hundreds) is used. In the eighth clockwise position, the rotary contactors are not connected to trigger circuits in a digital converter, rather they are connected to points of fixed voltage, either high or low, approximately equal to the extremes normally present at the anodes of the trigger circuit tubes. These fixed voltages provide identifying coding which is recorded between each series of signals of shaft position so that each group of signals is readily identified. Following the code recording, the rotary contactors of decimal digit selector 219 move on to additional positions not shown connected to derive and record data relative to the value of additional positions not shown connected to derive and record data relative to positions of additional shafts.

The "Read" and "Reset" signals which control the operation of the digital converters can be obtained by cam operated contacts associated with master synchronizer 218.

The principles involved in photographic recording of the information, together with certain simplifications that can be made require a code sequencer 221 which, for purposes of illustration, can be quite different from a sequencer employed for magnetic recording.

For illustration, a photographic recording circuit is explained in conjunction with Fig. 9 to which reference is now made. The signal is converted to a form which can be photographed on the face of a cathode ray tube 300 which has a short persistence screen. The cathode ray tube 300 is supplied with a horizontal sweep signal of precisely controlled characteristics by sweep circuit 301.

The five leads from the wafers of the decimal digit selector 219 are applied separately and independently to five coincidence circuits 302 which also, and in repetitive sequence receive separate timing signals from the ring counter 303 at a frequency determined by the oscillator and peaker 304. The coincidence circuits 302 are arranged to provide in a single lead, combined output signals to sequentially indicate the value of the corresponding binary digits for the decimal digits for each shaft position. The combined output signals intensity modulate the cathode ray tube so that a bright spot on the trace indicates one binary condition while a dark trace indicates the opposite binary condition. The repetitive sequence selected is not critical, typically, the information in line 237 may appear first, that at point 279 second, at 280 third, at 281 fourth and at 282 fifth, sweep occurring from left to right.

So that the sweep of the cathode ray tube trace is always synchronized to the operation of the coincidence circuits, the sweep circuit 301 is provided with a starting synchronizing signal from the ring counter 303 each time the counter achieves a selected condition which may be the first condition of the ring counter. Subsequently then the above indicated sequence will start with the second condition of the ring counter. Typically the oscillator and peaker 304 may deliver pulse signals at the rate of 24,000 per second causing the ring counter to operate with each series of signals repeated 4,000 times per second. This rate is high compared to the rate at which the decimal digit selector 219 operates (10 times per second) therefore several sweeps of the cathode ray tube beam will take place for each position of the rotary contacts of decimal digit selector 219. In photographing, the film can be transported continuously at a uniform rate, hence there will be a trace whenever contacts are completed through decimal digit selector 219. Light can reach the film in dependency on the binary code to indicate the decimal digit condition only when the contacts of decimal digit selector 219 are closed and at other times the tube is not illuminated.

Since the non-illuminated condition exists not only in one value of the binary code but also in intervals during which the contacts in decimal digit selector 219 are open, it is necessary that some identifying signals be recorded whenever the contacts of decimal digit selector 219 are closed. If such recording is not done there is a large possibility of error whenever the black-black-black-black binary combination appears. To this end the fifth track recording the signal in line 237 responsive to the closure in the fifth (synchronizing) wafer of decimal digit selector 219 is also presented on the cathode ray tube face for photographing.

In Fig. 10 a sample film strip is shown. Five columns are presented across the film, perpendicular to the direction of motion, to give the binary representation of each decimal digit of the shaft position and the identifying signal in line 237. A first one of these columns, for line 237, the guide marker column shows a signal each time the contacts of the fifth wafer section of decimal digit selector 219 are closed to give positive signal identification. The binary value of shaft position is given by the remaining four columns. To identify each group of decimal digits corresponding to the value of the position of each shaft, identifying codes are transmitted in the binary digit columns at regular intervals. These codes are obtained from decimal digit selector 219 by wiring selected contacts of the several wafer sections to a source of fixed bias.

At the start of a typical sampling cycle shown by the recording on the sample film strip of Fig. 10, and summarized in column 20 of the specification, identification coding is recorded twice, in the first two horizontal positions across the film. The signals which produce this coding are actually obtained from the decimal digit selector 219, however, and may be obtained simply by the connection of the appropriate terminals thereof to sources of fixed high or low or plus or minus voltages to cause the recording of appropriate signals. The particular coding selected to represent the start of a cycle is immaterial, however since the four binary digits give a maximum of sixteen combinations and only ten are employed one for each of the ten values of the decimal digit, the unused positions may be employed: For example the combination corresponding to the numeral 11 (eleven) as shown in the two top horizontal lines #1 and #2 of Fig. 10 may be selected. Following this, the next five lines across the film identified as #3 through #7 are allotted to the recording of binary digits for a first variable. Note the position of the decimal digit selector 219 in Fig. 11 may correspond to position #3. After the first variable, for further identification, the binary coding corresponding to the otherwise unused decimal numeral 13 (thirteen) is recorded in the line #8 across the film for position #6 of the decimal digit selector 219.

To represent a second variable, the next five lines, positions #9 through #13 are allotted. Following this the binary code for the numeral 12 (twelve) is recorded in the line for position #14.

The third variable is given by lines for positions #15 through #19 and is followed by the binary code for the numeral 14 (fourteen) in position #20.

A fourth variable is given by lines corresponding to positions #21 through #25. Subsequent to this fourth variable, the decimal numeral 11 (eleven) is again given in lines corresponding to positions #26 and #27.

Lines corresponding to positions #28 through #32 then give a fifth variable. A line for position #33 gives the decimal numeral 12 (twelve) for identification.

Following this the lines for positions #34 through #38 give a sixth variable. Position #39 is devoted to the presentation of the identifying decimal numeral 13 (thirteen).

Lines for positions #40 through #44 give the seventh variable, following which the line for position #45 gives the decimal numeral 14 (fourteen) for identification.

The eighth variable is given by the positions #46 through #50 and is again followed by the decimal numeral 14 (fourteen) given in the line for position #51.

Position #52 is unused or "blank."

Position #53 gives the "Reset" signal which is delivered to the trigger circuits in the digital converters 210 through 217 to reset them to their reference conditions.

Position #54 is a "blank" position which is set aside so that all trigger circuits will be given sufficient time to reach stability after the occurrence of the "Reset" signal.

Position #55 gives the "Read" signal which is delivered to all digital converters in parallel to cause them to derive the binary coded representation of the position of the corresponding shaft. To give the digital converters sufficient time to derive their signals and to permit all trigger circuits to reach stability, positions #56 through #60 are not used.

Following this, position #1 again comes up to repeat the above cycle.

This action is summarized as follows:

| Decimal Digit Selector Positions | | Quantity |
|---|---|---|
| From | To (Incl.) | |
| 1 | 2 | Code decimal 11. |
| 3 | 7 | 1st variable. |
| 8 | ------ | Code decimal 13. |
| 9 | 13 | 2nd variable. |
| 14 | ------ | Code decimal 12. |
| 15 | 19 | 3rd variable. |
| 20 | ------ | Code decimal 14. |
| 21 | 25 | 4th variable. |
| 26 | 27 | Code decimal 11. |
| 28 | 32 | 5th variable. |
| 33 | ------ | Code decimal 12. |
| 34 | 38 | 6th variable. |
| 39 | ------ | Code decimal 13. |
| 40 | 44 | 7th variable. |
| 45 | ------ | Code decimal 14. |
| 46 | 50 | 8th variable. |
| 51 | ------ | Code decimal 14. |
| 52 | ------ | Blank. |
| 53 | ------ | "Reset" (not recorded). |
| 54 | ------ | Blank. |
| 55 | ------ | "Read" (not recorded). |
| 56 | 60 | Blank. |

The code signals (decimal numerals 11, 12, 13, 14) that are recorded corresponding to positions #1, 2, 6, 12, 18, 24, 25, 29, 35, 41, 47 have been described in connection with photographic recording, however the same decimal digit sequence and coding could be employed for both typical systems and the guide markers would be recorded in both cases for each selector position for reference and checking purposes. It is not necessary to record guide markers for positions #53 through #60.

The information recorded by this apparatus can be played back by transcriber 222 (Fig. 1) for ready insertion into automatic calculating equipment. Operation of the transcriber may be at a speed much slower than the recording speed, typically at 1/100 the speed thereof. Again the actual equipment required may assume different forms to make the most of the storage medium employed but in any set-up the same basic principles are involved, that of converting the binary information into a form which can be used by automatic calculating equipment. To this end the data sorter 223 and code changer 224 as shown in Fig. 1 are employed. Tabulation may be made by a suitable teletypewriter 225.

Components of a typical data sorter 223 for magnetic storage equipment are shown in block form in Fig. 14 to which reference is now made. The apparatus of Fig. 14 is further described and claimed in a separate patent application Serial Number 102,183, filed June 30, 1949, entitled "Signal Polarity Selector" in the name of Marvin P. Young.

In Fig. 14 the reproduced signals from magnetic tape as delivered by transcriber 222 are supplied to terminal 400. The reset or reference signals are separated from the binary digit signals in separator 401 and applied separately to reset circuit 433 and differentiator circuit 410. As previously mentioned these signals are all in sequence, the reference or reset signal typically occurring first, followed by plus or minus representation of the values of each of the four binary digits utilized to define the value of a single decimal digit.

The positive and negative pulses applied in sequence to differentiator circuit 410 are typified in waveform A of Fig. 15. The reset signal delivered to reset circuit 433 is shown in waveform B of Fig. 15. As shown by waveform C of Fig. 15 each positive pulse supplied to the differentiator circuit 410 produces a short duration positive pulse followed by a short duration negative pulse.

Similarly each negative pulse produces a short duration negative pulse followed by a short duration positive pulse.

The signal as shown by waveform C in Fig. 15 is applied to pulse separator 411 which is a combination of biased circuits arranged to deliver the positive differentiated pulses to point 412 and the negative differentiated pulses to point 413. Pulse shaper 414 receives the positive pulses from point 412 then amplifies and inverts them to produce negative pulses as shown by waveform D of Fig. 15 which are applied to point 415. Pulse shaper 416 receives the negative pulses from point 413, amplifies them and supplies them as negative pulses to point 417. These negative pulses are indicated by waveform E of Fig. 15.

Negative pulses from point 415 are applied to a sequencer 418 typically a four-stage ring counter. In response to a typical first negative signal appearing at point 415, waveform D (Fig. 15) the sequencer 418 delivers a positive enabling voltage level to a gated amplifier circuit 424 and removes a positive enabling voltage level from gated amplifier circuit 425. A second negative input pulse to sequencer 418 returns the positive enabling voltage level to the second gated amplifier circuit 425 and removes the positive voltage from a third gated amplifier 426. Similarly a third negative pulse delivered to sequencer 418 returns the positive enabling voltage level to gated amplifier circuit 426 and removes it from the fourth gated amplifier 427 and a fourth negative signal causes the return of the positive enabling voltage level to gated amplifier circuit 427. These four positive enabling voltage levels with their time relationships are indicated in Fig. 15 by the raised portions of waveforms F, H, J and L, respectively.

The gated amplifier circuits 424, 425, 426, 427 are also supplied with positive signals from a second sequencer 428 which in construction is almost an exact duplicate of the sequencer 418. The positive signals from sequencer 428 are supplied as short pulses through suitable differentiator circuits responsive to the negative pulses at point 417 shown by waveform E. The short positive signals from sequencer 428 together with their time relationships are indicated by waveforms G, I, K, and M of Fig. 15.

Bias for the gated amplifier circuits 424, 425, 426, 427 is set at such a point that the tubes are normally non-conductive, however, when one, typified by gated amplifier circuit 424, receives a short positive signal from sequencer 428 at such time that a positive enabling voltage level is also present at that point delivered from sequencer 418, conduction therein takes place to provide a positive output signal from the cathode thereof.

Since sequencer 418 provides a positive properly timed enabling voltage level to the typical gated amplifier circuit 424 only in response to a first negative pulse of waveform D in Fig. 15 and that positive signal at the gated amplifier circuit 424 is terminted by the last negative pulse of waveform D to produce the positive portions of waveform F as shown, it is apparent that the positive pulse from sequencer 428 in waveform G must be supplied in this interval for the gated amplifier circuit 424 to supply an output signal. The time duration of this interval for the gated amplifier circuit 424 is indicated in waveform F of Fig. 15. In waveforms F and G which show the time relationship between the signals supplied to gated amplifier circuit 424 it is seen that a time coincidence occurs so that an output signal as shown by waveform N is delivered in response to the first pulse of waveform A.

The second pulse of waveform A is negative. For such a pulse, the differentiated negative portion occurs before the differentiated positive portion, hence the short positive pulse from sequencer 428 is applied to the gated amplifier circuit 425 in the interval of the negative portion of waveform H before the positive portion thereof starts in response to the second negative pulse of waveform D so that gated amplifier circuit 425 cannot conduct. It is therefore seen by waveform O that an output is not realized from a negative pulse such as the second pulse of waveform A.

The third and fourth pulses of waveform A are both positive, hence for each, the differentiated positive pulse occurs before the differentiated negative pulse so that the positive enabling voltage levels from sequencer 418, waveforms J and L start before the occurrence of corresponding positive pulses from sequencer 428, waveforms K and M, respectively. This condition results in conduction by gated amplifier circuits 426 and 427 to produce the output signals of waveforms P and Q, respectively.

Following the fourth pulse of waveform A, the pulse of waveform B is applied to terminal 433–C of the reset circuit 433 which provides shaping as required to effect reset of the sequencers 418, 428 if they are not in the previously mentioned initial condition so that they are always maintained in a reference condition catisfactory to respond to a succeeding series of four pulses such as those of waveform A.

It is thus seen that the apparatus so far described is capable of distinguishing between negative and positive input pulses and providing separated output signals for input signals of selected polarity.

The signals thus obtained are non-coincident, that is, they are obtained one after another in the various lines. In certain situations, for example, in the tabulation by the teletypewriter 225 of Fig. 1, it may be desirable to obtain the four values simultaneously. To this end, memory circuits are employed in an alternate manner. Every time the sequencer 418 reaches a condition such as that produced by the first pulse of waveform D it produces an output signal which is delivered to electronic switch 434 (Fig. 14). Electronic switch 434 may be a trigger circuit possessed of two stable states and connected to change from one state to the other each time an input signal is supplied thereto. This operation of switch 434 may thus take place with the leading edge of a first positive pulse of waveform A or the trailing edge of a first negative pulse. Such action is not objectionable because negative pulses are blocked and do not appear in the output. Such a first negative pulse would be missed due to the switching, however, one would be assured that such a negative pulse was present, and a correct output reading obtained.

Switch 434 as shown in Fig. 14 operates two series of gated amplifiers having sections 435–A, 435–B, 435–C, 435–D and 436–A, 436–B, 436–C, 436–D, respectively, to deliver signals from gated amplifier circuits 424, 425, 426, 427 alternately to two groups of memory circuits 437, 438. Buffer amplifiers 435, 436 are placed in the output circuits from electronic switch 434 for isolation purposes. Gated amplifier sections 435–A, B, etc. and 436–A, B, etc. are connected and operate in the same manner as the previously discussed gated amplifier circuits 424, 425, 426, 427, that is, only when they are supplied with an enabling signal from electronic switch 434 are they responsive to output signals from the preceding signal source, gated amplifier circuit 424, 425, 426, 427. Since they receive signals from electronic switch 434 in an alternate manner, memory circuits 437, 438 receive signals for alternate groups of four signals such as those of waveform A.

When electronic switch 434 opens gated amplifier sections 435–A, 435–B, 435–C, 435–D to permit delivery of signals to the memory circuits 437, a simultaneous signal delivered through buffer amplifier 435 goes to memory circuits 438 to cause the return thereof to reference conditions ready for a subsequent group of signals. Since each memory circuit in the groups 437, 438 will require reset only if it received a pulse from the corresponding gated amplifier circuit 424, 425, 426, 427, only those storage circuits receiving signals (corresponding to positive pulses of waveform A) will experience reset. Suitable connection of the parallel output leads from memory circuits 437, 438 will then deliver output signals only from those memory stages of the circuits 437, 438 which experience reset.

It is this combined output wherein the four binary signals are simultaneously present for each decimal digit, that is delivered to the code changer 224 to control the operation of the teletypewriter 225.

Code changer 224 employs matrix transposition elements similar to the matrix shown in Fig. 7. Teletypewriters generally operate with a code selected by the manufacturer thereof which is neither in the decimal or the binary system. Accordingly, the matrix design will have to provide the proper transposition. In certain instances two matrices may be employed, a first to convert from the binary system to the decimal system, and a second to convert from the decimal system to the teletypewriter system.

To improve the accuracy of the system, a sequence checking device 226 may be included which follows through in the correct sequence as stored on a separate check recording and at the speed of the information from the transcriber 222, the operation of the identifying numerals 11, 12, 13, 14 placed between the different variables. If for any reason the reset signals and the identifying signals (11, 12, 13, 14) as played back fall out of step with those on the check recording of the sequence checker 226, suitable indication as by visual or oral devices or simply a switch stopping the entire playback process will enable an operator to correct the difficulty.

From the foregoing discussion it is apparent that considerable modification of the features of the present invention is possible without exceeding the scope thereof as defined in the appended claims for example, other types of coding can be employed in the converter units, such as a straight binary coding which would convey the same information as the coded decimal system in 15 binary digits instead of the 20 digits herein employed.

The invention described herein may be manufactured and used by or for the Government of the United States of America for governmental purposes without the payment of any royalties thereon or therefor.

What is claimed is:

1. A position sensing device for determining the position of rotatable shafts comprising, sensing means for each shaft deriving in binary digital form information relative to each of a selected number of decimal digits of shaft position in degrees of angle, timing means synchronizing the derivation of the binary digital information by each of the last named means, time sequencing means combining into a single path in a sequential identical manner the binary digital information, and recording means connected to the time sequencing means operative to record all of the combined information on a single recording track.

2. A position sensing device for determining the position of rotatable shafts comprising, sensing means for each shaft deriving in binary digital form information relative to each decimal digit of the decimal representation of shaft position in degrees and decimal positions thereof to a desired accuracy, control apparatus synchronizing the derivation of information for all rotatable shafts, storage means holding the derived information a selected interval of time, sequencing means connected to said storage means controlling the sequential delivery of the stored information into a single signal path, and recording means connected to the sequencing means and responsive to record the stored information delivered into the single signal path thereof on a single recording track.

3. A position sensing device for determining the position of rotatable shafts comprising, sensing means for each shaft deriving in binary digital form information relative to each decimal digit of the decimal digital representation of shaft position in degrees and decimal portions thereof to a desired accuracy, control apparatus synchronizing the simultaneous derivation of binary information for all rotatable shafts, a plurality of storage circuits each independently responsive to the simultaneously derived binary information to hold binary conditions representative of the individual binary components thereof, four primary signal paths representative of the four binary digits required to represent a decimal digit, primary sequencing means responsive to the binary conditions of the storage circuits simultaneously delivering the groups of binary digits for each of the decimal digits for all shafts in sequence to the appropriate primary signal paths, a secondary signal path, secondary sequencing means sequentially delivering each one of every group of binary digits appearing simultaneously in the primary signal paths to the secondary signal path, identification signal generator means cooperative with the primary sequencing means to deliver identifying signals to the primary signal paths positively identifying the decimal digits for each shaft, and recording means connected to the secondary signal path and responsive to record information therein on a single recording track.

4. A position sensing device for determining the position of a rotatable shaft comprising, a first rotatable member angularly calibrated by a group of binary coded signal tracks provided with rotational motion of the same angularity as the shaft, said signal tracks bearing binary information relative to the value of the hundreds and tens decimal digit of the shaft position in degrees, a second rotatable member angularly calibrated by a group of binary coded signal tracks synchronized with the first member and provided with rotational motion of an angularity thirty-six times that of the shaft, said group of signal tracks carried by said second member bearing binary information relative to the value of the units decimal digit of the shaft position in degrees, a third rotatable member angularly calibrated by a group of binary coded signal tracks synchronized with the first and second members and provided with rotational motion of an angularity 360 times that of the shaft, said group of signal tracks carried by said third member bearing binary information relative to the value of the tenths and hundredths decimal digits of the shaft position in degrees, and photo-electric signal pick-up apparatus cooperative with the group of signal tracks periodically operative to derive binary type signals relative to the values of the decimal digits of the shaft position at selected time instants.

5. A position sensing device for determining the position of a rotatable shaft comprising, a first rotatable member carrying a group of signal tracks bearing binary information in two states relative to the tenths and hundredths decimal digits of a unit of angular position of the rotatable shaft, drive means providing said first member with synchronized angular motion of 360 times the angular motion of the rotatable shaft, a second rotatable member carrying a group of signal tracks bearing binary information in two states relative to the units decimal digit of a unit of angular position of the rotatable shaft, drive means providing said second member with synchronized angular motion of 36 times the angular motion of the rotatable shaft, a third member carrying a group of signal tracks bearing binary information in two states relative to the hundreds and tens decimal digits of units of angular position of the rotatable shaft, drive means providing said third member with angular motion synchronized with the rotatable shaft, and signal pick-up apparatus cooperative with the groups of signal tracks deriving binary type signals relative to the values of the decimal digits of the units of shaft position at selected time instants.

6. A position sensing device for determining the position of a rotatable shaft comprising, a first rotatable member carrying a group of signal tracks bearing binary information as transparent and opaque sections thereon relative to the tenths and hundredths decimal digits of a unit of angular position of the rotatable shaft, drive means providing said first member with synchronized angular motion of 360 times the angular motion of the rotatable shaft, a second rotatable member carrying a group of signal tracks bearing binary information as transparent and opaque sections thereon relative to the units decimal digit of a unit of angular position of the rotatable shaft, drive means providing said second member with synchronized angular motion of 36 times the angular motion of the rotatable shaft, a third member carrying a group of signal tracks bearing binary information as transparent and opaque sections thereon relative to the tens and hundreds decimal digits of units of angular position of the rotatable shaft, drive means providing said third member with angular motion synchronized with the rotatable shaft, and a plurality of photoelectric sensitive devices for each member responsive to light transmission through the signal tracks in specific regions thereof to produce separate output signals relative to the values of the decimal digits characterizing shaft position at selected time instants.

7. A position sensing device for determining the position of a rotatable shaft comprising, a first rotatable member angularly calibrated by a group of binary coded signal tracks provided with rotational motion of the same angularity as the shaft, said signal tracks bearing binary information relative to the value of the hundreds and tens decimal digit of the shaft position in degrees, a second rotatable member angularly calibrated by a group of binary coded signal tracks synchronized with the first member and provided with rotational motion of an angularity thirty-six times that of the shaft, said group of signal tracks carried by said second member bearing binary information relative to the value of the units decimal digit of the shaft position in degrees, a third rotatable member angularly calibrated by a group of binary coded signal tracks synchronized with the first and second members and provided with rotational motion of an angularity 360 times that of the shaft, said group of signal tracks carried by said third member bearing binary information relative to the value of the tenths and hundredths decimal digits of the shaft position in degrees, signal pick-up apparatus cooperative with the group of signal tracks periodically operative to derive binary type signals relative to the values of the decimal digits of the shaft position at selected time instants, and storage means fed by said signal pick-up apparatus for storing the binary information derived.

8. A position sensing device for determining the position of a rotatable shaft comprising, a first member carrying a group of eleven signal tracks eight of which carry information as transparent and opaque sections thereof relative to the tenths and hundredths decimal digits of angular position of the rotatable shaft and first, second, and third control signal tracks, drive means providing the first member with synchronized angular motion of 360 times the angular motion of the rotatable shaft, a second member carrying a group of six signal tracks four of which carry information as transparent and opaque sections thereof relative to the units decimal digit of angular position of the rotatable shaft and first and second control signal tracks, drive means providing the second member with synchronized angular motion of 36 times the angular motion of the rotatable shaft, a third member carrying a group of eight signal tracks bearing binary information as transparent and opaque sections thereof relative to the tens and hundreds decimal digits of angular position of the rotatable shaft, drive means providing the third member with angular motion in synchronism with the rotatable shaft, a first light generator system continuously operative to supply light to the first control signal track of the first member, a second light generator system operative when energized to supply light to the eight information tracks and the second and third control signal tracks of the first member, first light sensitive means connected to the second light generator system responsive to light transmission through the first control signal track in the first member to control energizing of the second light generator system, a third light generator system operative when energized to supply light to the signal tracks of the second member, second light sensitive means connected to the third light generator system responsive to light transmission through the second and third control signal tracks to control energizing of the third light generator system, a fourth light generator system operative when energized to supply light to the signal tracks of the third member, third light sensitive means connected to the fourth light generator system responsive to light transmission through the control signal tracks of the second member to control energizing of the fourth light generator system, and a plurality of fixedly positioned light sensitive pick up means equal in number to the total number of information signal tracks on the first, second and third members responsive to light transmission through each information signal track in a selected region to supply separate output signals in dependency on such light transmission.

9. In a position sensing device of a type in which higher order digital values of said position are given by a member moving a fractional amount of the distance of other members which give the lower order digital values of said position, means for eliminating ambiguity in readings comprising, two electric circuits operated by any lower order indicating member, energizing means included in said electric circuits to alternately energize said circuits during predetermined portions of the movement of said lower order indicating member, and selecting means included in each said circuit to operate on the sensing member of the next higher order, said selecting means cooperating with the position indications on said last mentioned member to designate accurately the correct higher order digital value at the dividing point between two of said higher order values.

10. Apparatus of the type described in claim 9 in which each said selecting means comprises a source of light to be directed on the higher order indicating member.

11. Apparatus according to claim 10 in which said indicating members are formed with openings therein to permit passage of light from said sources therethrough, and photoelectric means to indicate position as a result of actuation by the selectively delivered light.

12. In a position indicating device of a type in which the indicating means comprises a plurality of discs geared together in such a way that every disc indicating a higher order decimal digit of position rotates a fraction of the rotation of an adjacent geared disc which indicates the next lower order decimal digit, means for increasing the selectivity of every higher order indication through interaction with the next lower order disc comprising a plurality of photoelectric means in spaced relationship to and radially arranged relative to each said disc, there being concentric arcuate slots in said discs arranged to give binary representations of digital positions to said photo means, pairs of circumferentially spaced light sources situated on the opposite sides of said discs from said photo means, each light source of the pair being equidistant from the photo means and equidistant from the disc, circuit means including each said pair of spaced light sources and actuated by a pair of photoelectric means spaced from an adjacent lower order disc, and concentric arcuate slots in said last mentioned disc arranged to permit light to pass alternately to said actuating photo means so as to selectively actuate the proper light source to avoid ambiguity of indication of binary values on the higher order disc.

References Cited in the file of this patent

UNITED STATES PATENTS

| | | |
|---|---|---|
| 1,813,908 | Bethenod | July 14, 1931 |
| 2,132,213 | Locke | Oct. 4, 1938 |
| 2,207,743 | Larson | July 16, 1940 |
| 2,254,933 | Bryce | Sept. 2, 1941 |
| 2,268,133 | Carlson | Dec. 30, 1941 |
| 2,278,485 | Potts | Apr. 7, 1942 |
| 2,318,591 | Couffignal | May 11, 1943 |
| 2,397,604 | Hartley | Apr. 2, 1946 |
| 2,453,454 | Norwine | Nov. 9, 1948 |
| 2,496,585 | Harper | Feb. 7, 1950 |
| 2,502,837 | Entz et al. | Apr. 4, 1950 |
| 2,595,701 | Potter | May 6, 1952 |